United States Patent
Lee

(10) Patent No.: US 11,262,939 B2
(45) Date of Patent: Mar. 1, 2022

(54) MEMORY SYSTEM, MEMORY CONTROLLER, AND OPERATION METHOD

(71) Applicant: SK hynix Inc., Gyeonggi-do (KR)

(72) Inventor: Joung Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 51 days.

(21) Appl. No.: 16/823,583

(22) Filed: Mar. 19, 2020

(65) Prior Publication Data
US 2021/0064274 A1 Mar. 4, 2021

(30) Foreign Application Priority Data
Aug. 30, 2019 (KR) .................. 10-2019-0107212

(51) Int. Cl.
*G06F 3/06* (2006.01)

(52) U.S. Cl.
CPC ............ *G06F 3/0656* (2013.01); *G06F 3/064* (2013.01); *G06F 3/0614* (2013.01); *G06F 3/0653* (2013.01); *G06F 3/0658* (2013.01); *G06F 3/0673* (2013.01)

(58) Field of Classification Search
CPC ...... G06F 3/0656; G06F 3/0614; G06F 3/064; G06F 3/0653; G06F 3/0658; G06F 3/0673
See application file for complete search history.

(56) References Cited

U.S. PATENT DOCUMENTS

| | | | | |
|---|---|---|---|---|
| 6,173,378 B1 * | 1/2001 | Rozario | .................. | G06F 13/18 365/230.05 |
| 6,272,589 B1 * | 8/2001 | Aoki | ..................... | G06F 3/0607 710/56 |
| 6,332,196 B1 * | 12/2001 | Kawasaki | ............. | G06F 3/0656 713/300 |
| 6,631,446 B1 * | 10/2003 | Cherkauer | ............ | G06F 3/0613 711/133 |

(Continued)

FOREIGN PATENT DOCUMENTS

| | | |
|---|---|---|
| JP | 2009-123320 | 6/2009 |
| KR | 10-2003-0090313 | 11/2003 |
| KR | 10-2015-0028610 | 3/2015 |

OTHER PUBLICATIONS

Jeff Berger, IBM Redbooks, "DB2 11 for z/OS Buffer Pool Monitoring and Tuning", An IBM Redpaper publication, Jul. 2014. (Year: 2014).*

*Primary Examiner* — Khoa D Doan
(74) *Attorney, Agent, or Firm* — IP & T Group LLP

(57) ABSTRACT

Embodiments of the present disclosure relate to a memory system, a memory controller and an operating method, which allocate one or more of a plurality of buffer slots in a buffer pool to a write buffer as write buffer slots or to a read buffer as read buffer slots, configures initial values of count information on the respective write buffer slots and the respective read buffer slots, which indicate remaining allocation periods respectively, and updates the count information on each of at least some of the write buffer slots when (Continued)

data is written to the write buffer or updates the count information on each of at least some of the read buffer slots when data is read out from the read buffer, thereby providing optimal data read and write performance and minimizing overhead caused in the process of dynamically changing the buffer size.

20 Claims, 20 Drawing Sheets

(56) References Cited

U.S. PATENT DOCUMENTS

| | | | | |
|---|---|---|---|---|
| 7,437,716 | B1* | 10/2008 | Cantrill | G06F 11/3636 |
| | | | | 438/758 |
| 8,762,682 | B1* | 6/2014 | Stevens | G06F 3/0656 |
| | | | | 711/202 |
| 10,733,110 | B1* | 8/2020 | Volpe | G06F 3/0616 |
| 2003/0217235 | A1* | 11/2003 | Rowlands | G06F 12/0831 |
| | | | | 711/141 |
| 2006/0015660 | A1* | 1/2006 | Nguyen | G06F 3/0676 |
| | | | | 710/52 |
| 2006/0190659 | A1* | 8/2006 | Biran | G06F 13/4059 |
| | | | | 710/310 |
| 2008/0263044 | A1* | 10/2008 | Cantrill | G06F 11/3612 |
| 2009/0313426 | A1* | 12/2009 | See | G06F 3/0676 |
| | | | | 711/112 |
| 2010/0005257 | A1* | 1/2010 | Tamura | G06F 3/0676 |
| | | | | 711/156 |
| 2010/0299499 | A1* | 11/2010 | Golla | G06F 9/3824 |
| | | | | 712/206 |
| 2014/0095745 | A1* | 4/2014 | Kawahara | G06F 5/065 |
| | | | | 710/53 |
| 2018/0150242 | A1* | 5/2018 | Yi | G06F 3/0616 |
| 2018/0336138 | A1* | 11/2018 | Simionescu | G06F 12/0862 |
| 2019/0087332 | A1* | 3/2019 | Jun | G06F 12/0811 |
| 2020/0387449 | A1* | 12/2020 | Simionescu | G06F 3/061 |

* cited by examiner

MEMORY SYSTEM, MEMORY CONTROLLER, AND OPERATION METHOD

CROSS-REFERENCES TO RELATED APPLICATION

The present application claims priority under 35 U.S.C. 119(a) to Korean patent application number 10-2019-0107212, filed in the Korean intellectual property office on Aug. 30, 2019, which is incorporated herein by reference in its entirety.

BACKGROUND

1. Field of the Invention

Embodiments of the present disclosure relate to a memory system, a memory controller, and an operating method.

2. Description of the Related Art

A memory system stores data on the basis of a request by a host such as a computer, a mobile terminal (e.g., a smart phone, a tablet PC, or the like), or any of various other electronic devices. The memory system may include a device for storing data in a non-volatile memory, such as a solid state drive (SSD), a universal flash storage (UFS) device, an embedded MMC (eMMC) device, or the like, or a device that stores data in a magnetic disk, such as a hard disk drive (HDD).

The memory system may further include a memory controller for controlling the memory device. The memory controller may receive a command from a host, and, on the basis of the received command, may perform or control operations of reading, writing, or erasing data from or to a volatile memory or a non-volatile memory included in the memory system. In addition, the memory controller may drive firmware for performing logical operations to execute or control these operations.

The memory controller uses a read buffer for the read operation and uses a write buffer for the write operation. In this case, the sizes of each of the read and write buffers, which provide optimal performance within a limited buffer space, may continue to vary with time. Therefore, the memory controller is required to dynamically change the size of each of these buffers while minimizing overhead caused by the change in the buffer size.

SUMMARY

Embodiments of the present disclosure may provide a memory system, a memory controller, and an operating method capable of providing optimal read and write performance.

In addition, embodiments of the present disclosure may provide a memory system, a memory controller, and an operating method capable of minimizing overhead incurred in the process of dynamically changing a buffer size.

According to an aspect, embodiments of the present disclosure may provide a memory system including a memory device including a plurality of memory blocks and a memory controller configured to control the memory device.

The memory controller may allocate one or more of a plurality of buffer slots in a buffer pool to a write buffer as write buffer slots or to a read buffer as read buffer slots.

The memory controller may configure initial values of count information on the respective write buffer slots and the respective read buffer slots, which indicate remaining allocation periods respectively.

The memory controller may update the count information on each of at least some of the write buffer slots when data is written to the write buffer.

Alternatively, the memory controller may update the count information on each of at least some of the read buffer slots when data is read out from the read buffer.

When a write operation on a target write buffer slot, among the write buffer slots, is completed, the memory controller may reduce a value of count information on the target write buffer slot by a first value.

When the value of count information on the target write buffer slot is less than or equal to a first threshold count value, the memory controller may return the target write buffer slot to the buffer pool.

When a read operation on a target read buffer slot, among the read buffer slots, is completed, the memory controller may reduce a value of count information on the target read buffer slot by a second value.

When the value of count information on the target read buffer slot is less than or equal to a second threshold count value, the memory controller may return the target read buffer slot to the buffer pool.

The memory controller may determine the initial value of count information on each of the write buffer slots on the basis of the number of write buffer slots (L), a size of a write data (M) received from a host, or a size of the write buffer slot (N).

The memory controller may determine the initial value of count information on each of the read buffer slots on the basis of the number of read buffer slots (L'), a size of read data (M'), and a size of the read buffer slot (N').

According to another aspect, embodiments of the present disclosure may provide a memory controller including a memory interface configured to communicate with a memory device including a plurality of memory blocks and a control circuit configured to control the memory device.

The control circuit may allocate one or more of a plurality of buffer slots in a buffer pool to a write buffer as write buffer slots or to a read buffer as read buffer slots.

The control circuit may configure initial values of count information on the respective write buffer slots and the respective read buffer slots, which indicate remaining allocation periods respectively.

The control circuit may update the count information on each of at least some of the write buffer slots when data is written to the write buffer.

Alternatively, the control circuit may update the count information on each of at least some of the read buffer slots when data is read out from the read buffer.

When a write operation on a target write buffer slot, among the write buffer slots, is completed, the control circuit may reduce a value of count information on the target write buffer slot by a first value.

When the value of count information on the target write buffer slot is less than or equal to a first threshold count value, the control circuit may return the target write buffer slot to the buffer pool.

When a read operation on a target read buffer slot, among the read buffer slots, is completed, the control circuit may reduce a value of count information on the target read buffer slot by a second value.

When the value of count information on the target read buffer slot is less than or equal to a second threshold count value the control circuit may return the target read buffer slot to the buffer pool.

The control circuit may determine the initial value of count information on each of the write buffer slots on the basis of a number of write buffer slots (L), a size of a write data (M) received from a host, and a size of the write buffer slot (N).

The control circuit may determine the initial value of count information on each of the read buffer slots on the basis of a number of read buffer slots (L'), a size of a read data (M'), and a size of the read buffer slot (N').

According to another aspect, embodiments of the present disclosure may provide a method of operating a memory controller.

The method of operating a memory controller may include a step of dynamically configuring a plurality of buffer slots in a buffer pool as one or more write buffer slots in a write buffer or one or more read buffer slots in a read buffer.

The method of operating a memory controller may include a step of configuring initial values of count information on the respective write buffer slots and the respective read buffer slots, which indicate remaining allocation periods respectively.

The method of operating a memory controller may include a step of updating count information on each of at least some of the write buffer slots when data is written to the write buffer or updating count information on each of at least some of the read buffer slots when data is read out from the read buffer.

According to another aspect, embodiments of the present disclosure may provide a controller including a pool including a plurality of slots, a buffer and a processor.

The processor may assign one or more of the slots to the buffer and set a count value for each of the assigned slots.

The processor may decrease the count value of each of the assigned slots each time data provided from a host is written into, or read out to the host from, the corresponding assigned slot.

The processor may return each slot back to the pool, when the count value of the corresponding slot reaches a threshold.

According to embodiments of the present disclosure, it is possible to provide optimal read performance and write performance.

In addition, according to embodiments of the present disclosure, it is possible to minimize overhead incurred in the process of dynamically changing the buffer size.

BRIEF DESCRIPTION OF THE DRAWINGS

The above and other aspects, features, and advantages of the present disclosure will be more apparent from the following detailed description taken in conjunction with the accompanying drawings, in which.

DETAIL DESCRIPTION

Embodiments of the present disclosure are described in detail below with reference to the accompanying drawings. Throughout the specification, reference to "an embodiment" or the like is not necessarily to only one embodiment, and different references to any such phrase are not necessarily to the same embodiment(s).

Figure 1:
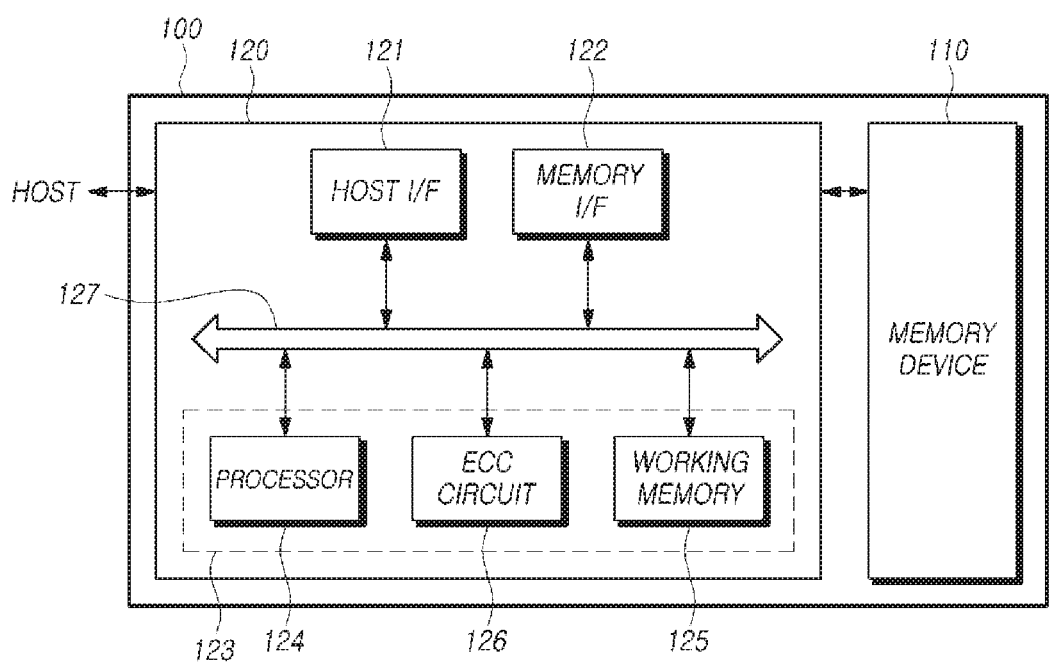
FIG. 1 is a diagram schematically illustrating a configuration of a memory system according to an embodiment of the present disclosure.

FIG. 1 is a diagram schematically illustrating the configuration of a memory system 100 according to an embodiment of the present disclosure.

Referring to FIG. 1, the memory system 100 may include a memory device 110 for storing data, a memory controller 120 for controlling the memory device 110, and the like.

The memory device 110 includes a plurality of memory blocks and operates in response to control of the memory controller 120. In this case, an operation of the memory device 110 may include, for example, a read operation, a program operation (also referred to as a "write operation"), an erasure operation, and the like.

The memory device 110 may include a memory cell array including a plurality of memory cells (hereinafter, simply referred to as "cells") that store data. Such a memory cell array may exist inside the memory block.

For example, the memory device 110 may be implemented as any of various types of memories, such as double data rate synchronous dynamic random access memory (DDR SDRAM), low power double data rate 4 (LPDDR4) SDRAM, graphics double data rate (GDDR) SDRAM, low power DDR (LPDDR), rambus dynamic random access memory (RDRAM), NAND flash memory, 3D NAND flash memory, NOR flash memory, resistive random access memory (RRAM), phase-change memory (PRAM), magnetoresistive random access memory (MRAM), ferroelectric random access memory (FRAM), and/or spin transfer torque random access memory (STT-RAM).

The memory device 110 may be configured as a three-dimensional array structure. Embodiments of the present disclosure may be applied to a charge trap flash (CTF) in which a charge storage layer is formed of an insulating film, as well as to a flash memory device in which the charge storage layer is formed of a conductive floating gate.

The memory device 110 is configured to receive a command, an address, and the like from the memory controller 120 and to access an area selected by an address in the memory cell array. That is, the memory device 110 may perform an operation corresponding to a command with respect to the area selected by the address.

For example, the memory device 110 may perform a program operation, a read operation, an erasure operation, and the like. In this regard, during the program operation, the memory device 110 may program data in the area selected by the address. In the read operation, the memory device 110 may read data from the area selected by the address. In the erasure operation, the memory device 110 may erase data stored in the area selected by the address.

The memory controller 120 may control write (program), read, erase, and background operations on the memory device 110. The background operation may include, for example, a garbage collection (GC), wear leveling (WL), or a bad block management (BBM).

The memory controller 120 may control the operation of the memory device 110 according to a request of a host (HOST). Alternatively, the memory controller 120 may control the operation of the memory device 110, in the absence of the request of the host.

The memory controller 120 and the host may be separate devices. Alternatively, the memory controller 120 and the host may be integrated into one device. In the following description, by way of example, the memory controller 120 and the host are considered separate devices.

Referring to FIG. 1, the memory controller 120 may include a memory interface 122, a control circuit 123, and a host interface 121.

The host interface 121 provides an interface for communication with the host.

The control circuit 123 may receive a command from the host through the host interface 121, and may process the received command.

The memory interface 122 is connected to the memory device 110 so as to provide an interface for communication with the memory device 110. That is, the memory interface 122 may be configured to provide an interface between the memory device 110 and the memory controller 120 in response to the control of the control circuit 123.

The control circuit 123 performs overall control operation of the memory controller 120, thereby controlling the memory device 110. To this end, for example, the control circuit 123 may include a processor 124 and/or a working memory 125. In an embodiment, the control circuit 123 may further include an error detection and correction circuit (ECC circuit) 126.

The processor 124 may control overall operation of the memory controller 120, and may perform logical operations. The processor 124 may communicate with the host through the host interface 121, and may communicate with the memory device 110 through the memory interface 122.

The processor 124 may perform a function of a flash translation layer (FTL). The processor 124 may convert a logical block address (LBA) provided by the host into a physical block address (PBA) through the flash translation layer (FTL). The flash translation layer (FTL) may receive a logical block address (LBA), and may convert the same into a physical block address (PBA) by means of a mapping table.

The FTL may use any of several methods of mapping the addresses depending on a mapping unit. Typical address mapping methods include a page mapping method, a block mapping method, and a hybrid mapping method.

The processor 124 is configured to randomize the data received from the host. For example, the processor 124 may randomize data received from the host using a randomizing seed. The randomized data is provided to the memory device 110 as data to be stored, and is programmed in the memory cell array.

The processor 124 is configured to derandomize data received from the memory device 110 during a read operation. For example, the processor 124 may derandomize the data received from the memory device 110 using the derandomizing seed. The derandomized data may be output to the host.

The processor 124 may execute firmware to control the operation of the memory controller 120. In other words, the processor 124 may execute (drive) the firmware loaded in the working memory 125 when booting in order to control overall operation of the memory controller 120 and perform logical operations.

The firmware is a program executed in the memory system 100, and may include various functional layers.

For example, the firmware may include one or more of a flash translation layer (FTL) that performs conversion between a logical address from the host and a physical address of the memory device 110, a host interface layer (HIL) that interprets a command from the host and transmits the same to the flash translation layer L), and a flash interface layer (FIL) that transmits a command indicated by the flash translation layer (FTL) to the memory device 110.

The firmware, for example, may be stored in the memory device 110, and may then be loaded in the working memory 125.

The working memory 125 may store firmware, program code, commands, or data for driving the memory controller 120. The working memory 125 may include, for example, as a volatile memory, static RAM (SRAM), dynamic RAM (DRAM), and/or synchronous DRAM (SDRAM).

The error detection and correction circuit 126 may be configured to detect error bit(s) of the data identified using error correction code and to correct the detected error bit(s). Here, the error-containing data may be stored in the working memory 125 or data read from the memory device 110.

The error detection and correction circuit 126 may be implemented so as to decode the data with the error correction code. The error detection and correction circuit 126 may be implemented as any of various code decoders. For example, a decoder that performs unsystematic code decoding or a decoder that performs systematic code decoding may be used.

For example, the error detection and correction circuit 126 may detect an error bit in sector units for each piece of read data. That is, each piece of read data may include a plurality of sectors. The sector may mean a smaller data unit than a page, which is a read unit of the flash memory. The sectors constituting each piece of read data may correspond to each other through addresses.

The error detection and correction circuit 126 may produce a bit error rate (BER), and may determine whether or not correction is possible in units of sectors. For example, if the bit error rate (BER) is higher than a reference value, the error detection and correction circuit 126 may determine that the corresponding sector is uncorrectable (failed). On the other hand, if the bit error rate (BER) is lower than a reference value, the error detection and correction circuit 126 may determine that the corresponding sector is correctable (passed).

The error detection and correction circuit 126 may sequentially perform the error detection and correction operation on all read data. If the sector included in the read data is correctable, the error detection and correction circuit 126 may omit the error detection and correction operation on the corresponding sector for the next read data. If the error detection and correction operation for all read data is completed as described above, the error detection and correction circuit 126 may detect a sector determined to be uncorrectable to be the last. One or more sectors may be determined to be uncorrectable. The error detection and correction circuit 126 may transmit information on the sectors determined to be uncorrectable (ex. address information) to the processor 124.

A bus 127 may be configured to provide channels between the elements 121, 122, 124, 125, and 126 of the memory controller 120. The bus 127 may include, for example, a control bus for transmitting various control signals, commands, and the like, and a data bus for transmitting a variety of data.

The elements of the memory controller 120 shown in FIG. 1 are only examples. Some of these elements may be omitted, and/or two or more elements may be integrated into one element. Of course, the memory controller 120 may include additional elements.

The memory device 110 is described in more detail with reference to FIG. 2.

Figure 2:
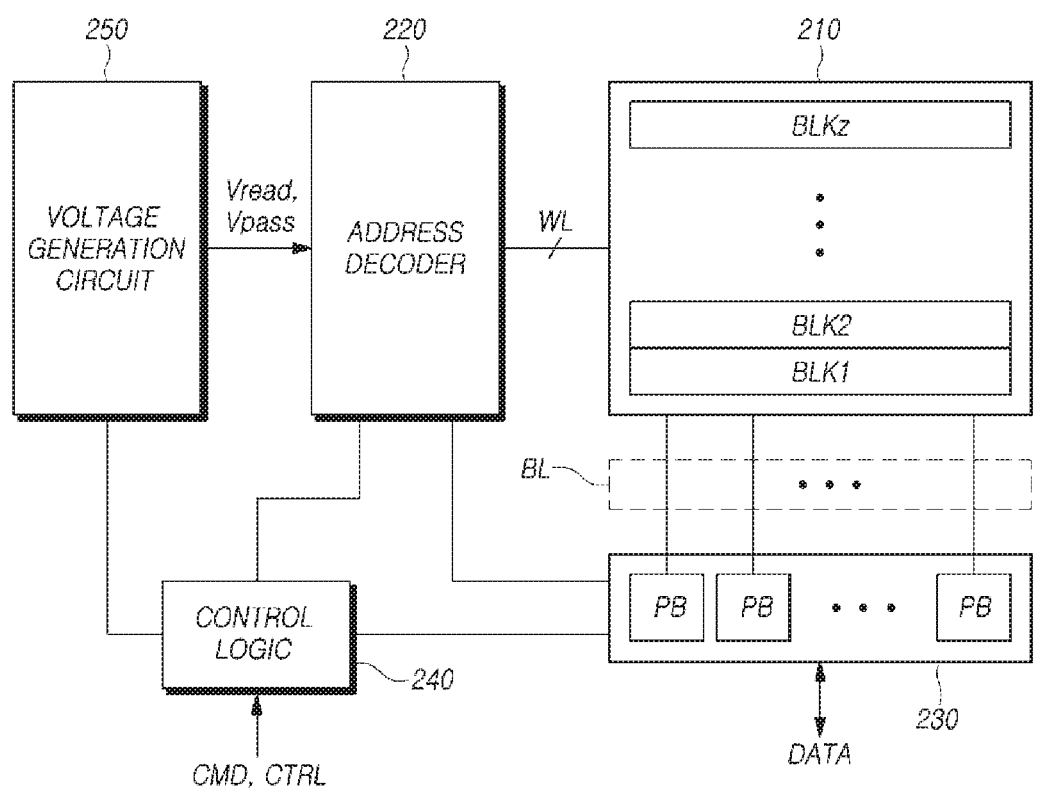
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read-and-write circuit 230, control logic 240, a voltage generation circuit 250, as well as other components.

The memory cell array 210 may include a plurality of memory blocks (BLK1) to (BLKz) (where, z is a natural number of 2 or more).

In the plurality of memory blocks (BLK1) to (BLKz), a plurality of word lines (WL) and a plurality of bit lines (BL) may be disposed in an intersecting pattern, and a plurality of memory cells (MC) may be arranged at the intersections.

The plurality of memory blocks (BLK1) to (BLKz) may be connected to the address decoder 220 through the plurality of word lines (WL). The plurality of memory blocks (BLK1) to (BLKz) may be connected to the read-and-write circuit 230 through the plurality of bit lines (BL).

Each of the plurality of memory blocks (BLK1) to (BLKz) may include a plurality of memory cells. For example, the plurality of memory cells may be non-volatile memory cells having a vertical channel structure.

The memory cell array 210 may be configured as a memory cell array having a two-dimensional structure, or alternatively as a memory cell array having a three-dimensional structure.

Each of the plurality of memory cells included in the memory cell array 210 may store at least one bit of data. For example, each of the plurality of memory cells in the memory cell array 210 may be a single-level cell (SLC) that stores one bit of data. As another example, each of the plurality of memory cells in the memory cell array 210 may be a multi-level cell (MLC) that stores two bits of data. As another example, each of the plurality of memory cells in the memory cell array 210 may be a triple-level cell (TLC) that stores three bits of data. As another example, each of the plurality of memory cells in the memory cell array 210 may be a quad-level cell (QLC) that stores 4 bits of data. As another example, the memory cell array 210 may include a plurality of memory cells each storing five or more bits of data.

Referring to FIG. 2, the address decoder 220, the read-and-write circuit 230, the control logic 240, the voltage generation circuit 250, and the like may collectively operate as a peripheral circuit for driving the memory cell array 210.

The address decoder 220 may be connected to the memory cell array 210 through a plurality of word lines (WL).

The address decoder 220 may be configured to operate in response to the control of the control logic 240.

The address decoder 220 may receive addresses through an input/output buffer inside the memory device 110. The address decoder 220 may be configured to decode a block address, among the received addresses. The address decoder 220 may select at least one memory block according to the decoded block address.

The address decoder 220 may receive a read voltage (Vread) and a pass voltage (Vpass) from the voltage generation circuit 250.

In the case of applying a read voltage during the read operation, the address decoder 220 may apply a read voltage (Vread) to a selected word line (WL) in a selected memory block, and may apply a pass voltage (Vpass) to the remaining unselected word lines (WL).

In a program verification operation, the address decoder 220 may apply a verification voltage generated from the voltage generation circuit 250 to a selected word line (WL) in a selected memory block, and may apply a pass voltage (Vpass) to the remaining unselected word lines (WL).

The address decoder 220 may be configured to decode column addresses of the received addresses. The address decoder 220 may transmit the decoded column addresses to the read-and-write circuit 230.

The read operation and the program operation of the memory device 110 may be performed in units of pages. The address received when requesting the read operation and the program operation may include a block address, a row address, and/or a column address.

The address decoder 220 may select one memory block and one word line according to the block address and the row address. The column address may be decoded by the address decoder 220 to then be provided to the read-and-write circuit 230.

The address decoder 220 may include a block decoder, a row decoder, a column decoder, and/or an address buffer.

The read-and-write circuit 230 may include a plurality of page buffers (PB). The read-and-write circuit 230 may operate as a "read circuit" during the read operation of the memory cell array 210, and may operate as a "write circuit" during the write operation thereof.

The above-described read-and-write circuit 230 may also be referred to as a "page buffer circuit" or a "data register circuit" including a plurality of page buffers (PB). Here, the read-and-write circuit 230 may include a data buffer executing a function of data processing, and in some cases, may further include a cache buffer executing a caching function.

A plurality of page buffers (PB) may be connected to the memory cell array 210 through a plurality of bit lines (BL). In order to sense threshold voltages (Vth) of the memory cells during the read operation and the program verification operation, the plurality of page buffers (PB) may continue to supply a sensing current to the bit lines (BL) connected to the memory cells, and may detect a change in the amount of current flowing according to the program state of the corresponding memory cell through a sensing node to then be latched as sensing data.

The read-and-write circuit 230 may operate in response to page buffer control signals output from the control logic 240.

In the read operation, the read-and-write circuit 230 senses data of the memory cell, thereby temporarily storing the read data, and then outputs the data (DATA) to the input/output buffer of the memory device 110. In an embodiment, the read-and-write circuit 230 may include a column selection circuit, as well as the page buffers (PBs) or page registers.

The control logic 240 may be connected to the address decoder 220, the read-and-write circuit 230, the voltage generation circuit 250, and the like. The control logic 240 may receive a command (CMD) and a control signal (CTRL) through an input/output buffer of the memory device 110.

The control logic 240 may be configured to control overall operation of the memory device 110 in response to the control signal (CTRL). The control logic 240 may output a control signal for adjusting the precharge potential levels of the sensing nodes of the plurality of page buffers (PBs).

The control logic 240 may control the read-and-write circuit 230 so as to perform a read operation of the memory cell array 210. The voltage generation circuit 250 may generate a read voltage (Vread) and a pass voltage (Vpass) used in the read operation in response to the voltage generation circuit control signal output from the control logic 240.

Figure 3:
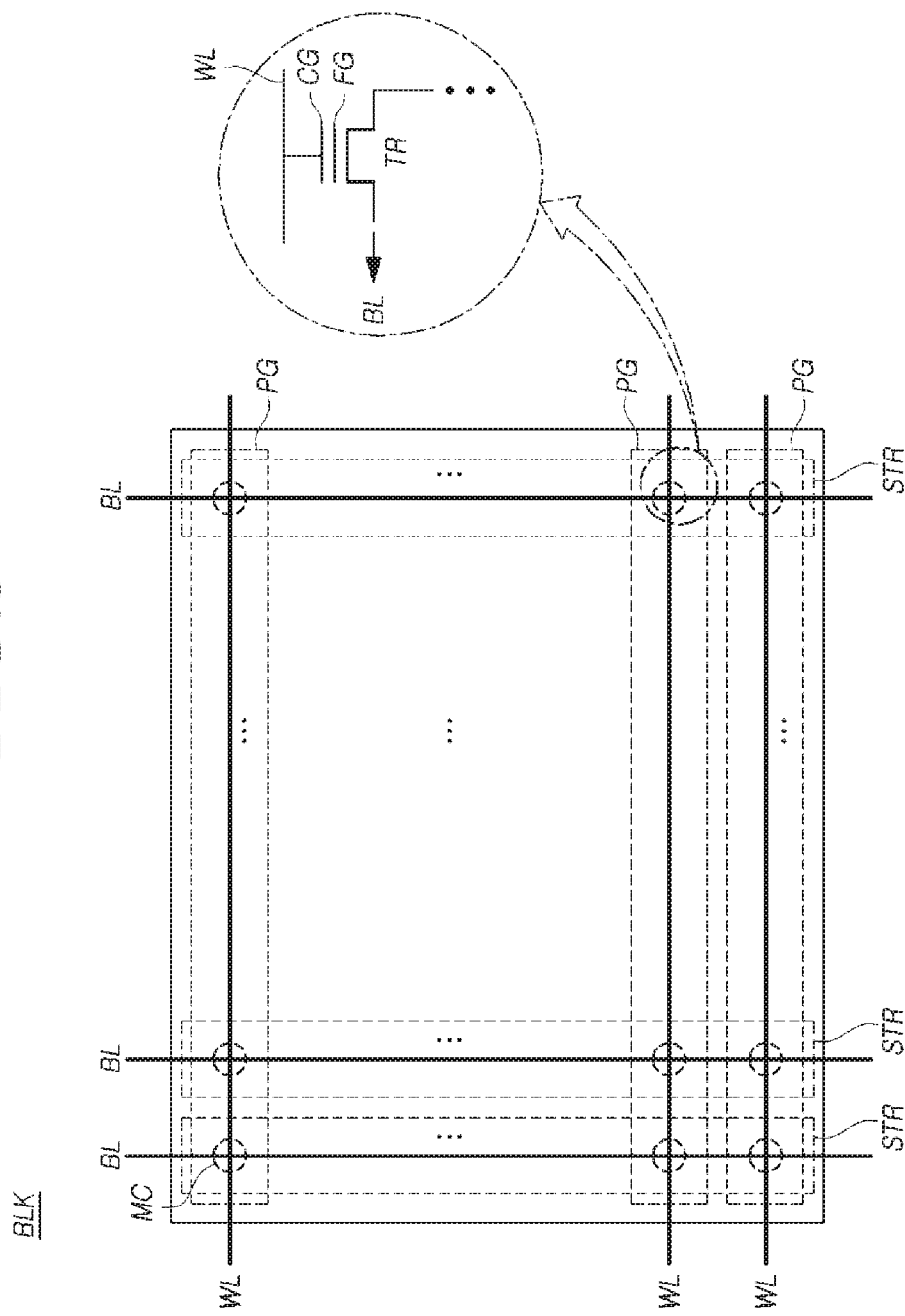
FIG. 3 is a diagram schematically illustrating a memory block of a memory device according to an embodiment of the present disclosure.

FIG. 3 is a diagram schematically illustrating a representative memory block (BLK) of a memory device 110 according to an embodiment of the present disclosure.

Referring to FIG. 3, the memory block (BLK) included in the memory device 110 may be configured as, for example, a plurality of pages (PG) and a plurality of strings (STR) intersecting each other.

The plurality of pages (PGs) corresponds to the plurality of word lines (WL), and the plurality of strings (STR) corresponds to the plurality of bit lines (BL).

The plurality of word lines (WL) and the plurality of bit lines (BL) may be arranged to intersect each other in the memory block (BLK). For example, the plurality of word lines (WL) may be arranged in a row direction, and the plurality of bit lines (BL) may be arranged in a column direction. As another example, the plurality of word lines (WL) may be arranged in a column direction, and the plurality of bit lines (BL) may be arranged in a row direction.

The plurality of word lines (WL) and the plurality of bit lines (BL) intersect each other, thereby defining a plurality of memory cells (MC). A transistor (TR) may be disposed in each memory cell (MC).

For example, the transistor (TR) disposed in each memory cell (MC) may include a drain, a source, a gate, and the like. The drain (or source) of the transistor (TR) may be connected to a corresponding bit line (BL) directly or via another transistor (TR). The source (or drain) of the transistor (TR) may be connected to the source line (which may be the ground) directly or via another transistor (TR). The gate of the transistor (TR) may include a floating gate (FG) surrounded by an insulator and a control gate (CG) to which a gate voltage is applied from the word line (WL).

Each of the plurality of memory blocks (BLK1) to (BLKz) may further include a first selection line (also referred to as a "source selection line" or a "drain selection line") arranged outside a first outermost word line that is closer to the read-and-write circuit 230 and a second selection line (also referred to as a "drain selection line" or a "source selection line") arranged outside a second outermost word line, among two outermost word lines.

In some cases, one or more dummy word lines may be further arranged between the first outermost word line and the first selection line. In addition, one or more dummy word lines may be further arranged between the second outermost word line and the second selection line.

With the memory block structure as shown in FIG. 3, the read operation and the program operation (write operation) may be performed in units of pages, and the erasure operation may be performed in units of memory blocks.

Figure 4:
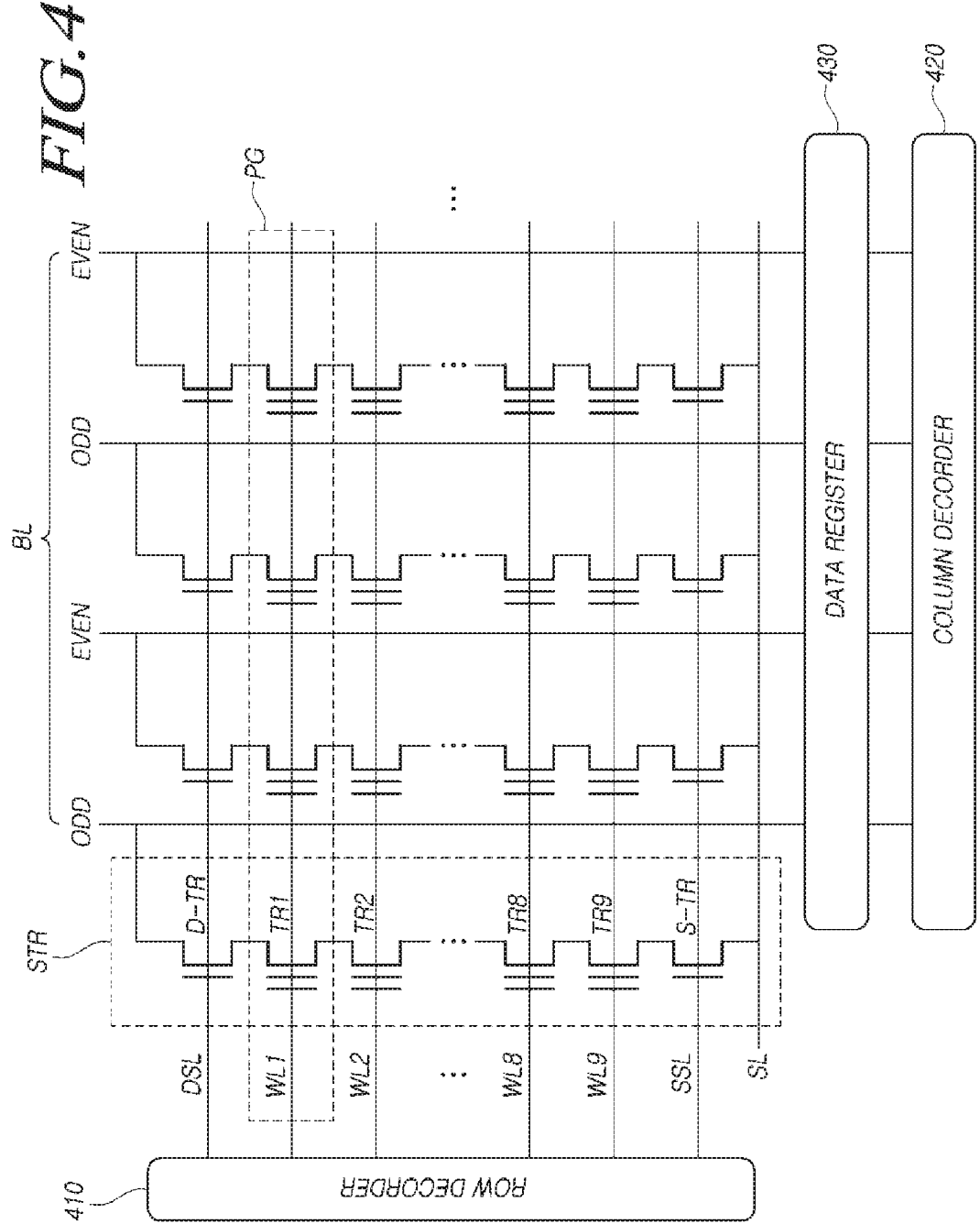
FIG. 4 is a diagram illustrating a structure of a word line and a bit line of a memory device according to an embodiment of the present disclosure.

FIG. 4 is a diagram illustrating the structure of a word line (WL) and a bit line (BL) of a memory device 110 according to an embodiment of the present disclosure.

Referring to FIG. 4, the memory device 110 includes a core area in which the memory cells (MC) are located and an auxiliary area, which is separate from the core area, for supporting the operation of the memory cell array 210.

The core area may include pages (PG) and strings (STR). In the core area, a plurality of word lines (WL1) to (WL9) and a plurality of bit lines (BL) are arranged to intersect each other.

The plurality of word lines (WL1) to (WL9) may be connected to a row decoder 410, and the plurality of bit lines (BL) may be connected to a column decoder 420. A data register 430 corresponding to the read-and-write circuit 230 may be provided between the plurality of bit lines (BL) and the column decoder 420.

The plurality of word lines (WL1) to (WL9) correspond to the plurality of pages (PG).

For example, as illustrated in FIG. 4, each of the plurality of word lines (WL1) to (WL9) may correspond to one page (PG). Alternatively, if each of the plurality of word lines (WL1) to (WL9) has a large size, each of the plurality of word lines (WL1) to (WL9) may correspond to two or more (e.g., two or four) pages (PG). The page (PG) may be a minimum unit for performing the program operation and the read operation. All the memory cells (MC) in the same page (PG) may simultaneously perform operations during the program operation and the read operation.

The plurality of bit lines (BL) may be dividing into odd bit lines (BL) and even bit lines (BL), which may be connected to the column decoder 420.

In order to access the memory cell (MC), an address may first enter a core area through the row decoder 410 and the column decoder 420 via an input/output terminal, and may designate a target memory cell. Designating the target memory cell means making access to the memory cell (MC) in the site where the word lines (WL1) to (WL9) connected to the row decoder 410 and the bit lines (BL) connected to the column decoder 420 intersect each other in order to program data thereto or read programmed data therefrom.

The pages (PG) in the first direction (e.g., the X-axis direction) are bound by a common word line (WL), and the strings (STR) in the second direction (e.g., the Y-axis direction) are bound (connected) by a common bit line (BL). Being bound by a common line means that the line is made of a material having the same structure and that the same voltage is simultaneously applied to the line. However, the voltage applied to the foremost memory cell (MC) may be slightly different from the voltage applied to the memory cell (MC) in the middle position or applied to the rearmost memory cell (MC), which are connected in series, due to voltage drop.

Since all data processing of the memory device 110 is performed by programing and reading through the data register 430, the data register 430 plays a pivotal role. If the data processing of the data register 430 is slow, all other areas must wait until the data register 430 completes the data processing. In addition, if the performance of the data register 430 deteriorates, the overall performance of the memory device 110 may be lowered.

Referring to the example in FIG. 4, one string (STR) may have a plurality of transistors (TR1) to (TR9) connected to a plurality of word lines (WL1) to (WL9). The areas in which the plurality of transistors (TR1) to (TR9) is provided correspond to memory cells (MC). The plurality of transistors (TR1) to (TR9) includes a control gate (CG) and a floating gate (FG) as described above.

The plurality of word lines (WL1) to (WL9) includes two outermost word lines (WL1) and (WL9). In terms of a signal path, a first selection line (DSL) may be arranged outside the first outermost word line (WL1) that is closer to the data register 430, and a second selection line (SSL) may be arranged outside the second outermost word line (WL9).

A first selection transistor (D-TR) that is turned on and off by the first selection line (DSL) has only a gate electrode connected to the first selection line (DSL) and does not include a floating gate (FG). A second selection transistor (S-TR) that is turned on and off by the second selection line (SSL) has only a gate electrode connected to the second selection line (SSL) and does not include a floating gate (FG).

The first selection transistor (D-TR) serves as a switch to turn on or off the connection between a corresponding string (STR) and the data register 430. The second selection transistor (S-TR) serves as a switch to turn on or off the connection between a corresponding string (STR) and a source line (SL). That is, the first select transistor (D-TR) and the second select transistor (S-TR) are provided at both ends of the string (STR) and serve as gatekeepers for connecting and disconnecting signals.

Since the memory system 100 must fill electrons in the target memory cell (MC) of the bit line (BL) to be programmed during the program operation, the memory system 100 applies a set turn-on voltage (Vcc) to the gate electrode of the first selection transistor (D-TR), thereby turning on the first selection transistor (D-TR), and applies a set turn-off voltage (e.g., 0V) to the gate electrode of the second selection transistor (S-TR), thereby turning off the second selection transistor (S-TR).

The memory system 100 turns on both the first selection transistor (D-TR) and the second selection transistor (S-TR) during a read operation or a verification operation. Accordingly, a current may pass through a corresponding string (STR) to the source line (SL) corresponding to the ground, so that the voltage level of the bit line (BL) may be measured. However, in the read operation, there may be a difference in the on-off timing between the first selection transistor (D-TR) and the second selection transistor (S-TR).

The memory system 100 may supply a set voltage (e.g., +20V) to a substrate through the source line (SL) during the erasure operation. In the erasure operation, the memory system 100 floats both the first selection transistor (D-TR) and the second selection transistor (S-TR) to produce an infinite resistance. Accordingly, the structure is configured such that the roles of the first selection transistor (D-TR) and the second selection transistor (S-TR) are eliminated, and such that electrons are moved by the potential difference only between the floating gate (FG) and the substrate.

Figure 5:
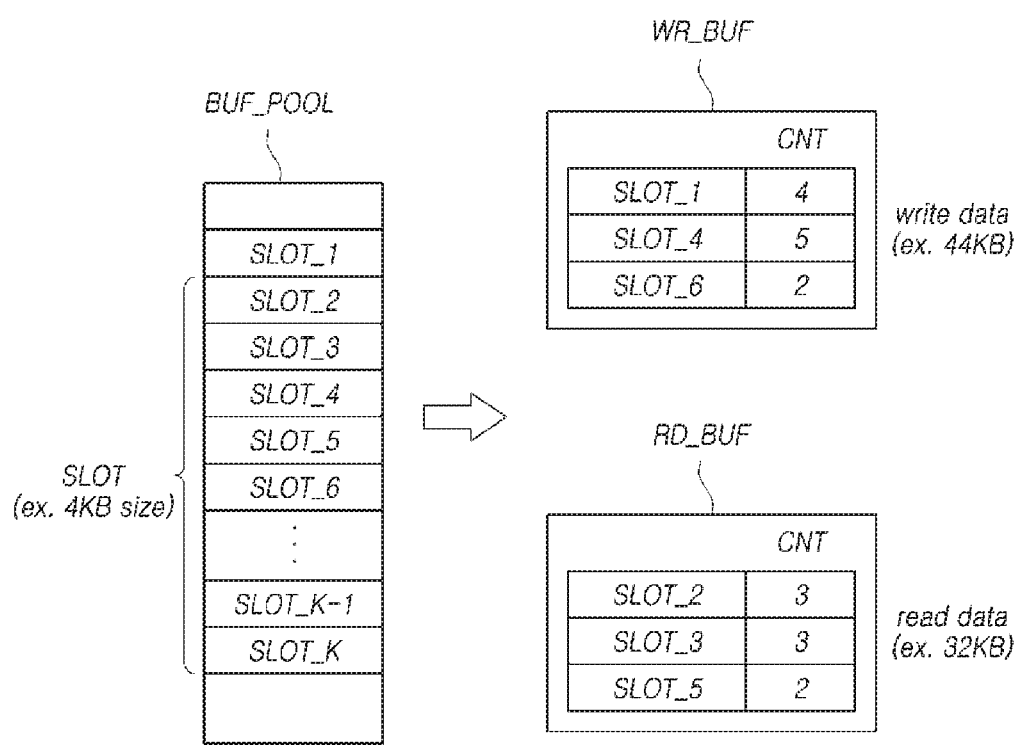
FIG. 5 is a diagram illustrating an example of configuring a write buffer and a read buffer in a memory system according to an embodiment of the present disclosure.

FIG. 5 is a diagram illustrating an example of setting a write buffer and a read buffer in a memory system 100 according to an embodiment of the present disclosure.

Referring to FIG. 5, the memory controller 120 included in the memory system 100 may dynamically configure K buffer slots (SLOT_1, SLOT_2, SLOT_3, SLOT_4, SLOT_5, SLOT_6, . . . , SLOT_K−1, and SLOT_K) (where, "K" is a natural number of 2 or more) included in a buffer pool (BUF_POOL) as one or more write buffer slots (SLOT_1, SLOT_4, and SLOT_6) in a write buffer (WR_BUF) or one or more read buffer slots (SLOT_2, SLOT_3, and SLOT_5) in a read buffer (RD_BUF).

Although it is illustrated in FIG. 5 that each of the write buffer (WR_BUF) and read buffer (RD_BUF) includes three buffer slots, the number of buffer slots in either of these buffers is not limited thereto.

The write buffer (WR_BUF) is a space for temporarily storing data written to the memory device 110. Therefore, executing a write operation on the write buffer slot of the write buffer (WR_BUF) means that data written to the memory device 110 is temporarily stored in the write buffer slot.

The read buffer (RD_BUF) is a space for temporarily storing data read from the memory device 110. Therefore, executing a read operation on the read buffer slot of the read buffer (RD_BUF) means that data read from the memory device 110 is temporarily stored in the read buffer slot.

The buffer pool (BUF_POOL) is a memory area used to allocate the write buffer (WR_BUF) or the read buffer (RD_BUF). For example, the buffer pool (BUF_POOL) may be located on a working memory 125 in the memory controller 120.

One or more buffer slots in the buffer pool (BUF_POOL) may be in the write buffer (WR_BUF) or the read buffer (RD_BUF), but not both at the same time. One or more buffer slots in the buffer pool may not be in either the write buffer or the read buffer.

Select slots may be included in the write buffer (WR_BUF) at a first time, and may be included in the read buffer (RD_BUF) at a second time.

There are various methods of determining the size of each buffer slot in the buffer pool (BUF_POOL).

For example, the sizes of the respective buffer slots in the buffer pool (BUF_POOL) may be uniform, and may be integer multiples of a page size (e.g., 4 KB). This is due to the fact that the data read operation and the write operation are performed in units of pages in the memory device 110 and that the operation for determining the number and positions of the buffer slots included in the write buffer (WR_BUF or the read buffer RD_BUF can be minimized if the sizes of the respective buffer slots are uniform.

As another example, the buffer slots in the buffer pool (BUF_POOL) may be divided into a plurality of buffer slot groups, and the size of each buffer slot in the same buffer slot group may be the same, but buffer slots in different groups may have different sizes. For example, the size of a buffer slot in buffer slot group 1 may be the same as a page size (e.g., 4 KB), and the size of a buffer slot included in buffer slot group 2 may be double the page size (e.g., 4 KB*2=8 KB).

Any of various methods of indicating whether a buffer slot included in the buffer pool (BUF_POOL) belongs to the write buffer (WR_BUF) or the read buffer (RD_BUF) may be selected for use.

For example, the memory controller 120 may indicate whether each buffer slot is included in the write buffer (WR_BUF) or the read buffer (RD_BUF) using an enable bitmap for all the buffer slots included in the buffer pool (BUF_POOL).

Among the fields in the element corresponding to a buffer slot (SLOT_1) of the enable bitmap, if the field value corresponding to the write buffer (WR_BUF) is "1", it means that the buffer slot (SLOT_1) is included in the write buffer (WR_BUF), and if the field value is "0", it means that the buffer slot (SLOT_1) is not included in the write buffer (WR_BUF).

Likewise, among the fields in the element corresponding to a buffer slot (SLOT_1) of the enable bitmap, if the field value corresponding to the read buffer (RD_BUF) is "1", it means that the buffer slot (SLOT_1) is included in the read buffer (RD_BUF), and if the field value is "0", it means that the buffer slot (SLOT_1) is not included in the read buffer (RD_BUF).

As described above, the memory controller 120 may dynamically allocate buffer slots included in the buffer pool (BUF_POOL) to the write buffer (WR_BUF) or the read buffer (RD_BUF). Accordingly, the memory controller 120 may respond to a change in the ratio of write operations to read operations over time in setting the sizes of the write buffer (WR_BUF) and the read buffer (RD_BUF).

In this case, the memory controller 120 may set initial values of count information, e.g., counts (CNT) on the respective write buffer slots included in the write buffer (WR_BUF) and the respective read buffer slots included in the read buffer (RD_BUF), which indicate the remaining period allocated to one of the write buffer (WR_BUF) or the read buffer (RD_BUF).

In this case, the remaining period represents how long the write buffer slot or the read buffer slot remains allocated to the write buffer (WR_BUF) or the read buffer (RD_BUF).

Thereafter, the memory controller 120 may dynamically manage the buffer slots to be allocated to the write buffer (WR_BUF) or the read buffer (RD_BUF) according to the set count information (CNT).

In this case, the initial values of count information (CNT) on the respective write buffer slots included in the write buffer WR_BUF may be set to be different according to the total size of data that is required to be stored in the write buffer (WR_BUF).

For example, it is assumed that the write buffer (WR_BUF) stores a total of 44 KB of data in the write buffer slots (SLOT_1, SLOT_4, and SLOT_6) and that the size of each write buffer slot is 4 KB in FIG. 5. In this case, in order to write 4 KB of write data to the write buffer (WR_BUF) 11 times (=44 KB/4 KB), the memory controller 120 may set the initial values of the count information CNT on SLOT_1, SLOT_4, and SLOT_6 such that the sum of the initial values of the count information CNT on these write buffer slots correspond to "11" the number of times that 4 KB is written in, which in this example is 11.

In FIG. 5, the initial value of count information (CNT) on the write buffer slot (SLOT_1) is "4"; the initial value of count information (CNT) of the write buffer slot (SLOT_4) is "5"; the initial value of count information (CNT) of the write buffer slot (SLOT_6) is "2"; and the sum of the initial values of count information (CNT) is 11 (=4+5+2).

Likewise, the initial values of count information (CNT) on respective read buffer slots included in the read buffer (RD_BUF) may be set to be different according to the total size of data that is required to be stored in the read buffer (RD_BUF).

For example, it is assumed that the read buffer (RD_BUF) stores a total of 32 KB of data in the read buffer slots (SLOT_2, SLOT_3, and SLOT_5) and that the size of each read buffer slot is 4 KB. In this case, in order to read 4 KB of data out from the read buffer (RD_BUF) 8 times (=32 KB/4 KB), the memory controller 120 may set the initial values of count information CNT of SLOT_2, SLOT_3, and SLOT_5 such that the sum of the initial values of count information CNT of these read buffer slots is "8", which is the number of times that 4 KB data is read out.

In FIG. 5, the initial value of count information CNT on the read buffer slot (SLOT_2) is "3"; the initial value of count information (CNT) on the read buffer slot (SLOT_3) is "3"; the initial value of count information (CNT) on the read buffer slot (SLOT_5) is "2"; and the sum of the initial values of count information (CNT) is 8 (=3+3+2).

The values of count information (CNT) on the respective write buffer slots and read buffer slots, which are set as described above, may be updated while a write operation or a read operation is executed. In detail, the memory controller 120 may update count information on at least some of the write buffer slots when data is written to the write buffer. Alternatively, the memory controller 120 may update count information on at least some of the read buffer slots when data is read out from the read buffer.

Figure 6:
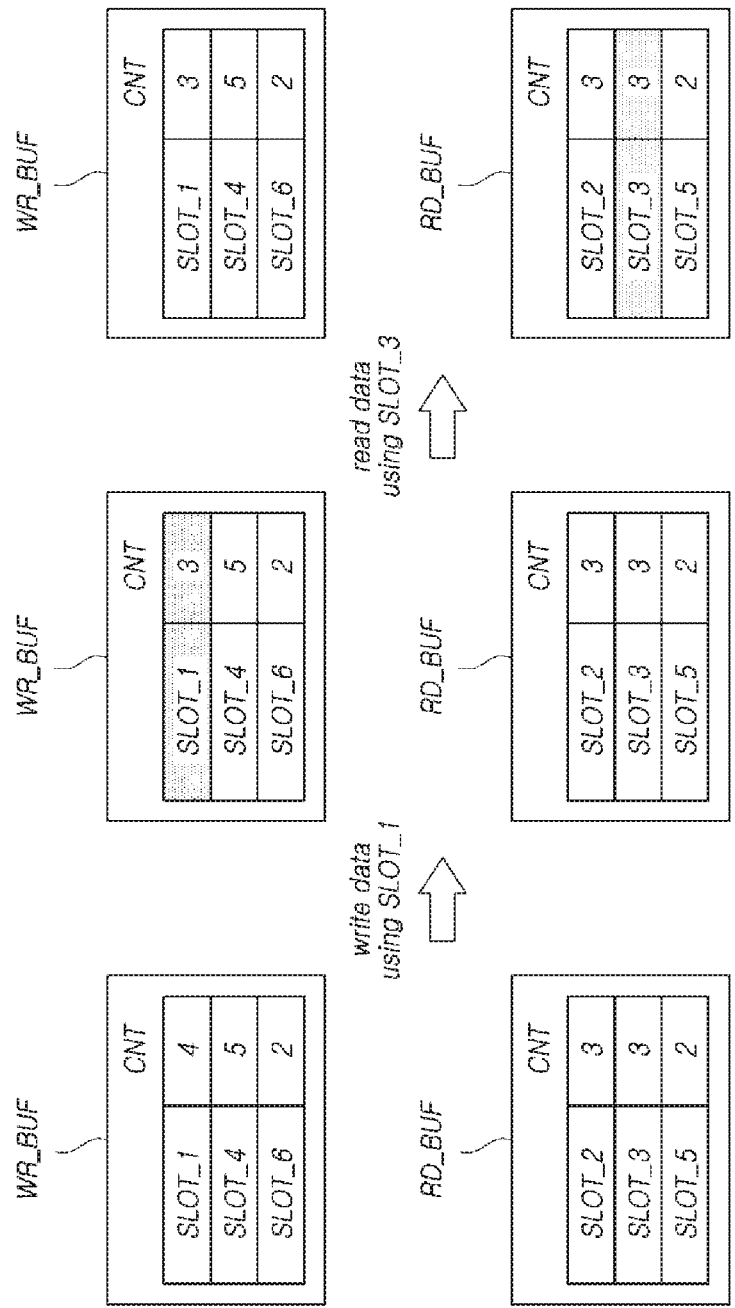
FIG. 6 is a diagram illustrating an example of updating count information on some write buffer slots or read buffer slots in a memory system according to an embodiment of the present disclosure.

FIG. 6 is a diagram illustrating an example of updating count information on some of write buffer slots or read buffer slots in a memory system 100 according to an embodiment of the present disclosure.

Referring to FIG. 6, with respect to the write buffer slots (SLOT_1, SLOT_4, and SLOT_6) in the write buffer (WR_BUF), the initial value of count information (CNT) on the write buffer slot (SLOT_1) is "4"; the initial value of count information (CNT) on the write buffer slot (SLOT_4) is "5"; and the initial value of count information (CNT) on the write buffer slot (SLOT_6) is "2".

In addition, with respect to the read buffer slots (SLOT_2, SLOT_3, and SLOT_5) in the read buffer (RD_BUF), the initial value of count information (CNT) on the read buffer slot (SLOT_2) is "3"; the initial value of count information (CNT) on the read buffer slot (SLOT_3) is "3"; and the initial value of count information (CNT) on the read buffer slot (SLOT_5) is "2".

In this case, it is assumed that the memory controller 120 of the memory system 100 stores data to be written to the memory device 110 in SLOT_1. As a result, the CNT on SLOT_1 may be changed from "4" to "3".

Subsequently, it is assumed that the memory controller 120 stores data read from the memory device 110 in SLOT_3. In this case, the CNT on SLOT_3 may be changed from "3" to "2".

The memory controller 120 may change the count information on the write buffer slot or the read buffer slot as described above, thereby dynamically configuring buffer slots allocated to the write buffer (WR_BUF) or the read buffer (RD_BUF).

The reason why the memory controller 120 dynamically configures buffer slots allocated to the write buffer (WR_BUF) or the read buffer (RD_BUF) on the basis of the count information (CNT), as described above, is as follows.

As described above, since the ratio of write operations to read operations may change over time, the memory controller 120 must dynamically change the sizes of the write buffer (WR_BUF) and the read buffer (RD_BUF) according thereto.

For example, assuming that the size of the entire buffer area is 10 KB and the ratio of write operations to read operations is allocate a 5 KB area to the write buffer (WR_BUF) and to allocate a 5 KB area to the read buffer (RD_BUF) for optimal read/write performance.

Thereafter, if the write/read ratio changes to 8:2 at a second time, the memory controller 120 should change the allocation. In this case, it is preferable for the memory controller 120 to allocate, to the read buffer (RD_BUF), 3 KB of 5 KB allocated to the write buffer (WR_BUF) for optimal read/write performance.

However, the memory controller 120 is not aware of a portion of the 5 KB area allocated to the write buffer (WR_BUF), which is no longer used. This is due to the fact that the data to be written to the memory device 110 may not be yet stored in the write buffer (WR_BUF) or that the data may not be written to the memory device 110 even though the data is stored in the write buffer (WR_BUF).

Therefore, after an entire write operation is completed, the memory controller 120 may allocate, to the read buffer (RD_BUF), 3 KB of the 5 KB area allocated to the write buffer (WR_BUF). In this case, since it takes time to increase in the size of the read buffer (RD_BUF), read performance may be lowered.

Therefore, in order to solve this problem, in an embodiment of the present disclosure, the memory controller 120 allocates the write buffer (WR_BUF) and the read buffer (RD_BUF) in units of buffer slots and uses count information on each buffer slot, thereby quickly identifying the parts that no longer need to be used for the read operation or the write operation.

Accordingly, the memory controller 120 is able to minimize overhead incurred in the process of dynamically changing the sizes of the write buffer and the read buffer. In addition, the memory controller 120 may directly return, to the buffer pool, buffer slots that no longer need to be used for the read operation or the write operation, so that the returned buffer slots may be immediately used for another read operation or write operation, thereby providing optimal data read and write performance.

Hereinafter, a specific example in which the memory controller 120 of the memory system 100 dynamically changes the sizes of the write buffer (WR_BUF) and the read buffer (RD_BUF) is described.

Figure 7:
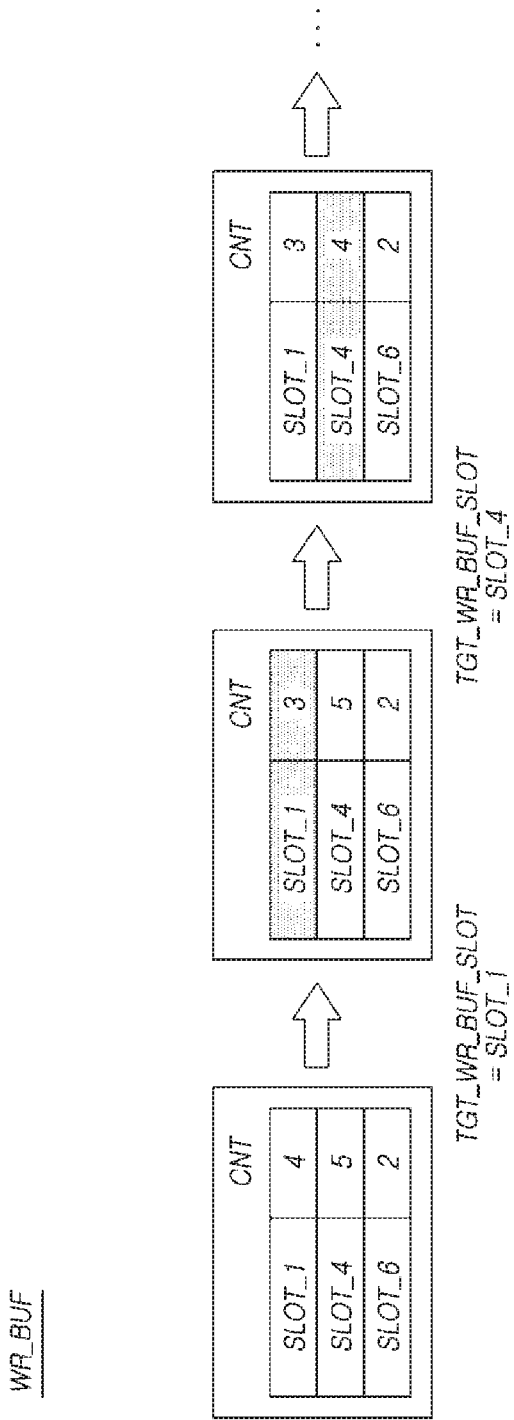
FIG. 7 is a diagram illustrating an example of reducing a count information value of a write buffer slot in a memory system according to an embodiment of the present disclosure.

FIG. 7 is a diagram illustrating an example of reducing count information value of a write buffer slot in a memory system 100 according to an embodiment of the present disclosure.

Referring to FIG. 7, if a write operation on one target write buffer slot (TGT_WR_BUF_SLOT), among the write buffer slots (SLOT_1, SLOT_4, and SLOT_6) in the write buffer (WR_BUF), is completed, the memory controller 120 of the memory system 100 may reduce the CNT on TGT_WR_BUF_SLOT by a first value.

In this case, completion of the write operation on TGT_WR_BUF_SLOT means that all data stored slot has been written to the memory device 110 or that all data having a set size has been written to the memory device 110.

For example, in the case where the size TGT_WR_BUF_SLOT is 4 KB, if 4 KB of data is written to the memory device 110, or if a set size of 2 KB of data is written thereto, it may be determined that the write operation on TGT_WR_BUF_SLOT has been completed.

It is assumed that the initial value of count information (CNT) on the write buffer slot (SLOT_1) is "4", that the initial value of count information (CNT) on the write buffer slot (SLOT_4) is "5", and that the initial value of count information (CNT) on the write buffer slot (SLOT_6) is "2" in FIG. 7. In addition, it is assumed that a first value, by which the value of count information (CNT) is reduced each time, is "1".

First, if the write buffer slot (SLOT_1) is configured as a target write buffer slot (TGT_WR_BUF_SLOT), the value of count information (CNT) on the write buffer slot (SLOT_1) is reduced by "1" from "4" to "3" after the write operation on the write buffer slot (SLOT_1) is completed.

Thereafter, if the write buffer slot (SLOT_4) is configured as a target write buffer slot (TGT_WR_BUF_SLOT), the value of count information (CNT) on the write buffer slot (SLOT_4) is reduced by "1" from "5" to "4" after the write operation on the write buffer slot (SLOT_4) is completed.

Figure 8:
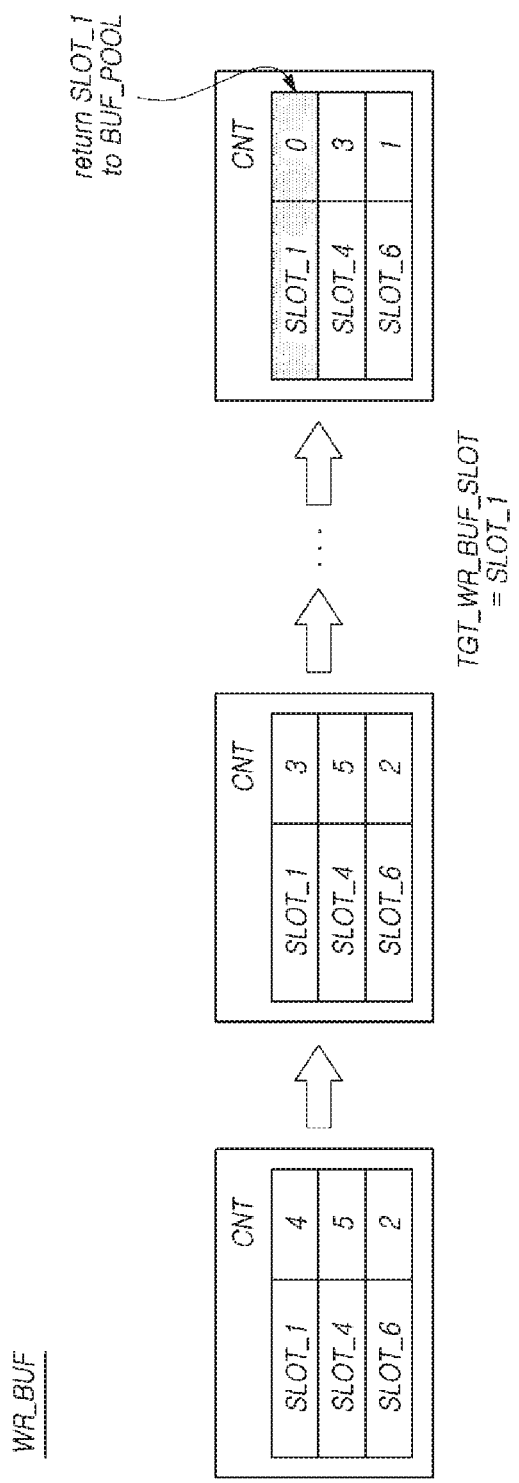
FIG. 8 is a diagram illustrating an example of returning a write buffer slot to a buffer pool in a memory system according to an embodiment of the present disclosure.

FIG. 8 is a diagram illustrating an example of returning a write buffer slot to a buffer pool in a memory system 100 according to an embodiment of the present disclosure.

Referring to FIG. 8, if a value of count information on one target write buffer slot (TGT_WR_BUF_SLOT), among the write buffer slots (SLOT_1, SLOT_4, and SLOT_6) in the write buffer (WR_BUF), is less than or equal to a first threshold count value, the memory controller 120 of the memory system 100 may return the target write buffer slot (TGT_WR_BUF_SLOT) to the buffer pool (BUF_POOL).

In FIG. 8, it is assumed that the first threshold count value is zero. The first threshold count value may be predetermined.

As data is written to SLOT_1, SLOT_4, and SLOT_6, the CNT on each of these slots is continuously reduced. Subsequently, it is assumed that the value of count information (CNT) on the write buffer slot (SLOT_1) changes from "1" to "0" in the case where the target write buffer slot (TGT_WR_BUF_SLOT) is the write buffer slot (SLOT_1).

In this case, the memory controller 120 returns the write buffer slot (SLOT_1) to the buffer pool (BUF_POOL). The write buffer slot (SLOT_1) returned to the buffer pool (BUF_POOL) may be included in the write buffer or read buffer again when a new write or read operation is performed.

Figure 9:
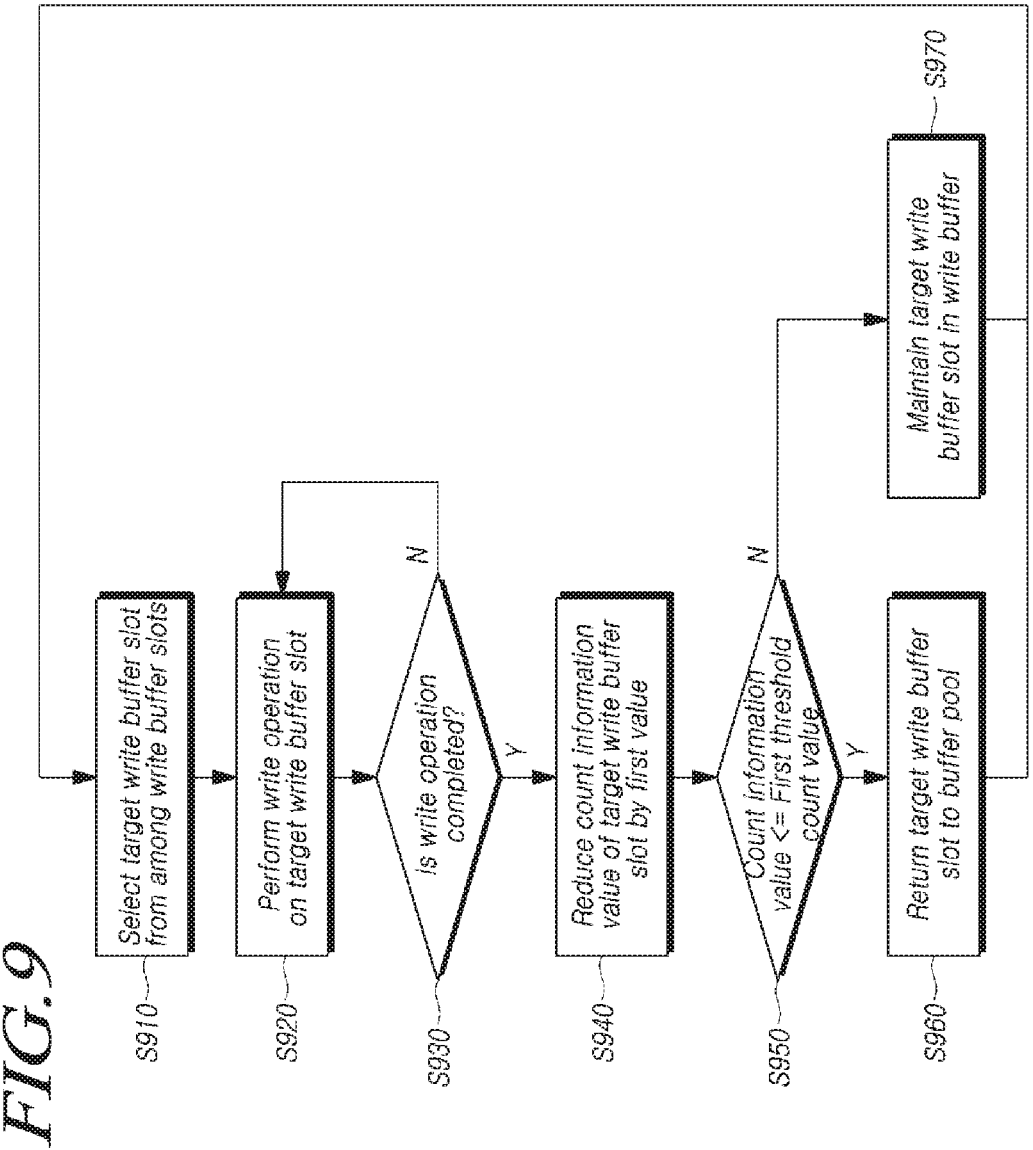
FIG. 9 is a flowchart illustrating operations described in FIGS. 7 and 8.

FIG. 9 is a flowchart illustrating the operations described with reference to FIGS. 7 and 8.

Hereinafter, an example in which the memory controller 120 performs the operation described with reference to FIGS. 7 and 8 is described.

The memory controller 120 may select a target write buffer slot from among the write buffer slots in the write buffer (S910). In addition, the memory controller 120 may execute a write operation on the selected target write buffer slot (S920).

Thereafter, the memory controller 120 determines whether or not the write operation on the target write buffer slot has been completed (S930). If the write operation has not been completed ("NO" in step S930), the memory controller 120 returns to step S920. On the other hand, if the write operation has been completed ("YES" in step S930), the memory controller 120 may reduce the value of count information on the target write buffer slot by a first value (S940).

Next, the memory controller 120 determines whether or not the value of count information on the target write buffer slot is less than or equal to a first threshold count value (S950). If so ("YES" in step S950), the memory controller 120 returns the target write buffer slot to the buffer pool (S960). On the other hand, if the value of count information exceeds the first threshold count value ("NO" in step S950), the memory controller 120 maintains the target write buffer slot in the write buffer (S970).

Thereafter, the memory controller 120 returns to the operation in step S910 to start another iteration.

Figure 10:
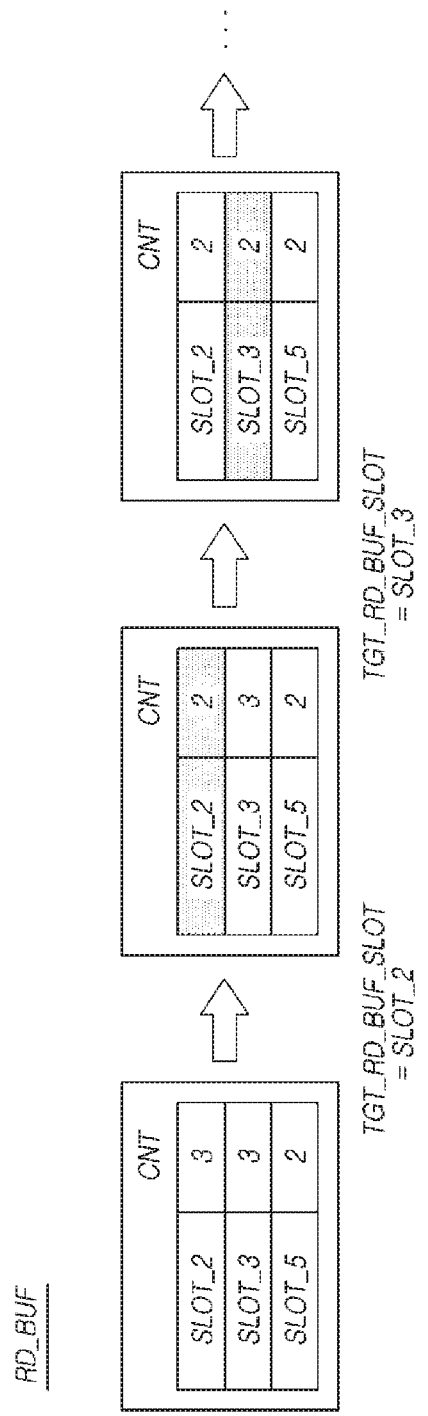
FIG. 10 is a diagram illustrating an example of reducing a count information value on a read buffer slot in a memory system according to an embodiment of the present disclosure.

FIG. 10 is a diagram illustrating an example of reducing a value of count information on a read buffer slot in a memory system 100 according to an embodiment of the present disclosure.

Referring to FIG. 10, if a read operation on one target read buffer slot (TGT_RD_BUF_SLOT), among the read buffer slots (SLOT_2, SLOT_3, and SLOT_5) in the read buffer (RD_BUF), is completed, the memory controller 120 of the memory system 100 may reduce the CNT on the TGT_RD_BUF_SLOT by a second value. The second value may be the same as or different from the first value described with reference to FIG. 7.

In this case, completion of the read operation on TGT_RD_BUF_SLOT means that all data stored in that slot is read out or is ready to be read out by the host (HOST) or that all data having a set size is read out or is ready to be read out by the host.

For example, in the case where the size of TGT_RD_BUF_SLOT is 4 KB, if 4 KB of data is read out by the host (HOST), or if a set size of 2 KB of data is read out by the host, it may be determined that the read operation on TGT_RD_BUF_SLOT has been completed.

It is assumed that the initial value of count information CNT on the read buffer slot (SLOT_2) is "3", that the initial value of count information (CNT) on the read buffer slot (SLOT_3) is "3", and that the initial value of count information (CNT) on the read buffer slot (SLOT_5) is "2" in FIG. 10. In addition, it is assumed that a second value, by which the value of count information (CNT) is reduced each time, is "1".

First, if the read buffer slot (SLOT_2) is configured as a target read buffer slot (TGT_RD_BUF_SLOT), the value of count information (CNT) on SLOT_2 is reduced by "1" from "3" to "2" after the read operation on SLOT_2 is completed.

Thereafter, if the read buffer slot (SLOT_3) is configured as a target read buffer slot (TGT_RD_BUF_SLOT), the value of count information (CNT) on SLOT_3 is reduced by "1" from "3" to "2" after the read operation on SLOT_3 is completed.

Figure 11:
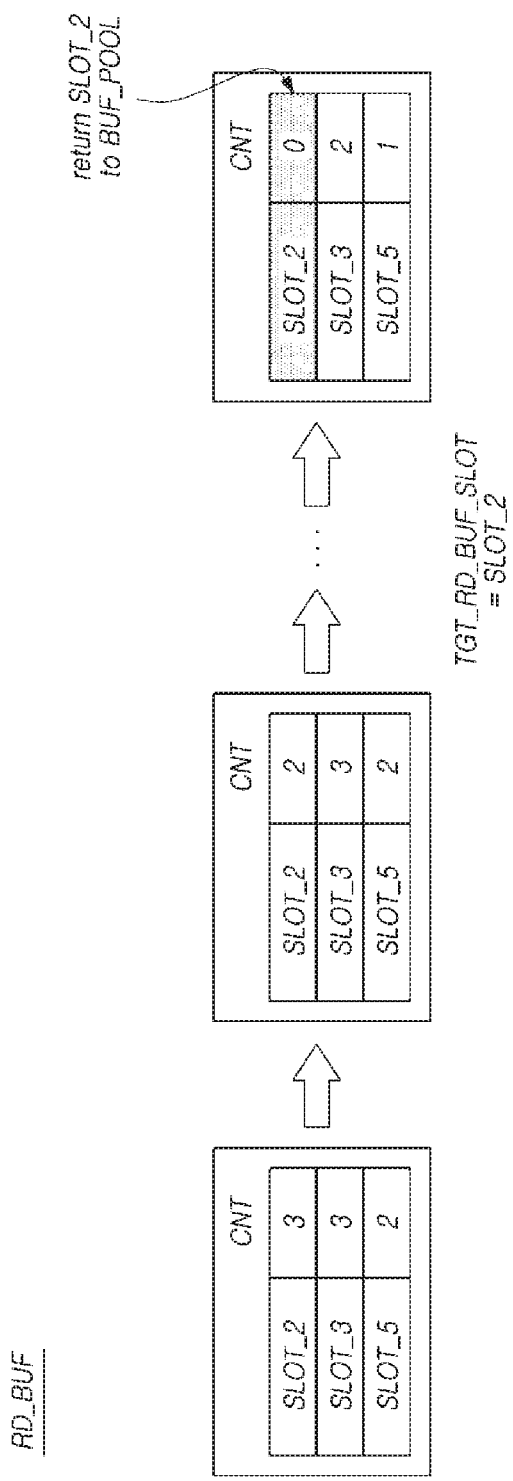
FIG. 11 is a diagram illustrating an example of returning a read buffer slot to a buffer pool in a memory system according to an embodiment of the present disclosure.

FIG. 11 is a diagram illustrating an example of returning a read buffer slot to a buffer pool in a memory system 100 according to an embodiment of the present disclosure.

Referring to FIG. 11, if a value of count information on a target read buffer slot (TGT_RD_BUF_SLOT), among the read buffer slots (SLOT_2, SLOT_3, and SLOT_5) in the read buffer (RD_BUF), is less than or equal to a second threshold count value, the memory controller 120 of the memory system 100 may return the target read buffer slot (TGT_RD_BUF_SLOT) to the buffer pool (BUF_POOL).

It is assumed that the second threshold count value is zero in FIG. 11. The second threshold count value may be predetermined.

As data is written to the respective read buffer slots (SLOT_2, SLOT_3, and SLOT_5), the values of count information (CNT) on each of these write buffer slots is reduced. Subsequently, it is assumed that the value of count information (CNT) on SLOT_2 changes from "1" to "0" if the TGT_RD_BUF_SLOT is SLOT_2.

In this case, the memory controller 120 returns the read buffer slot (SLOT_2) to the buffer pool (BUF_POOL). The read buffer slot (SLOT_2) returned to the buffer pool (BUF_POOL) may be included in the write buffer or read buffer again when a new write or read operation is performed.

Figure 12:
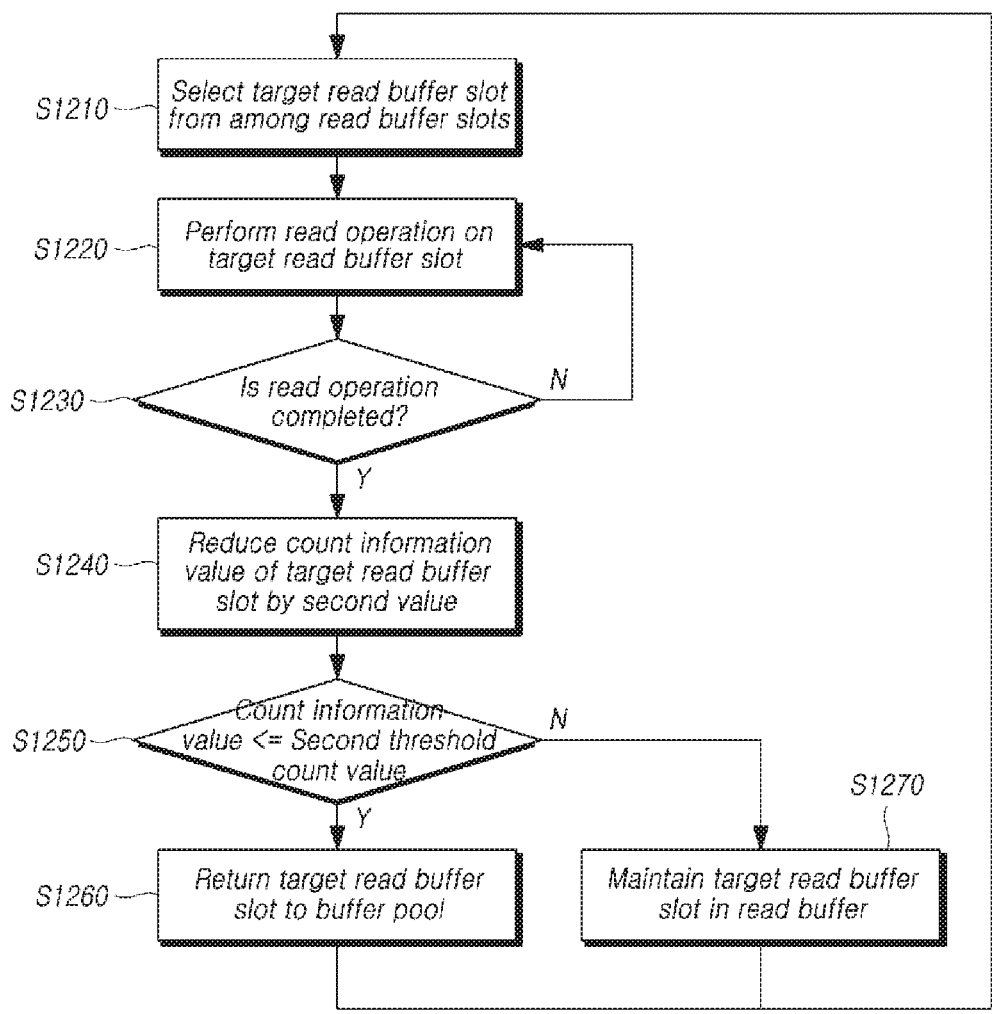
FIG. 12 is a flowchart illustrating operations described in FIGS. 10 and 11.

FIG. 12 is a flowchart illustrating the operations described in connection with FIGS. 10 and 11.

Hereinafter, an example in which the memory controller 120 performs the operation described with reference to FIGS. 10 and 11 is described.

The memory controller 120 may select a target read buffer slot from among the read buffer slots in the read buffer (S1210). In addition, the memory controller 120 may execute a read operation on the target read buffer slot selected in step S1210 (S1220).

Thereafter, the memory controller 120 determines whether or not the read operation on the target read buffer slot has been completed (S1230). If the read operation has not been completed ("NO" in step S1230), the memory controller 120 returns to step S1220. On the other hand, if the read operation has been completed ("YES" in step S1230), the memory controller 120 may reduce the value of count information on the target read buffer slot by a second value (51240).

Next, the memory controller 120 determines whether or not the value of count information on the target read buffer slot is less than or equal to a second threshold count value (S1250). If so ("YES" in step S1250), the memory controller 120 returns the target read buffer slot to the buffer pool (S1260). On the other hand, if the value of count information exceeds the second threshold count value ("NO" in step S1250), the memory controller 120 maintains the target read buffer slot in the read buffer (S1270).

Thereafter, the memory controller 120 returns to the operation in step S1210 to start another iteration.

Hereinafter, a detailed method of setting the number of write buffer slots included in the write buffer and initial values of count information on the respective write buffer slots according to a write command is described with reference to FIGS. 13 to 15.

Figure 13:
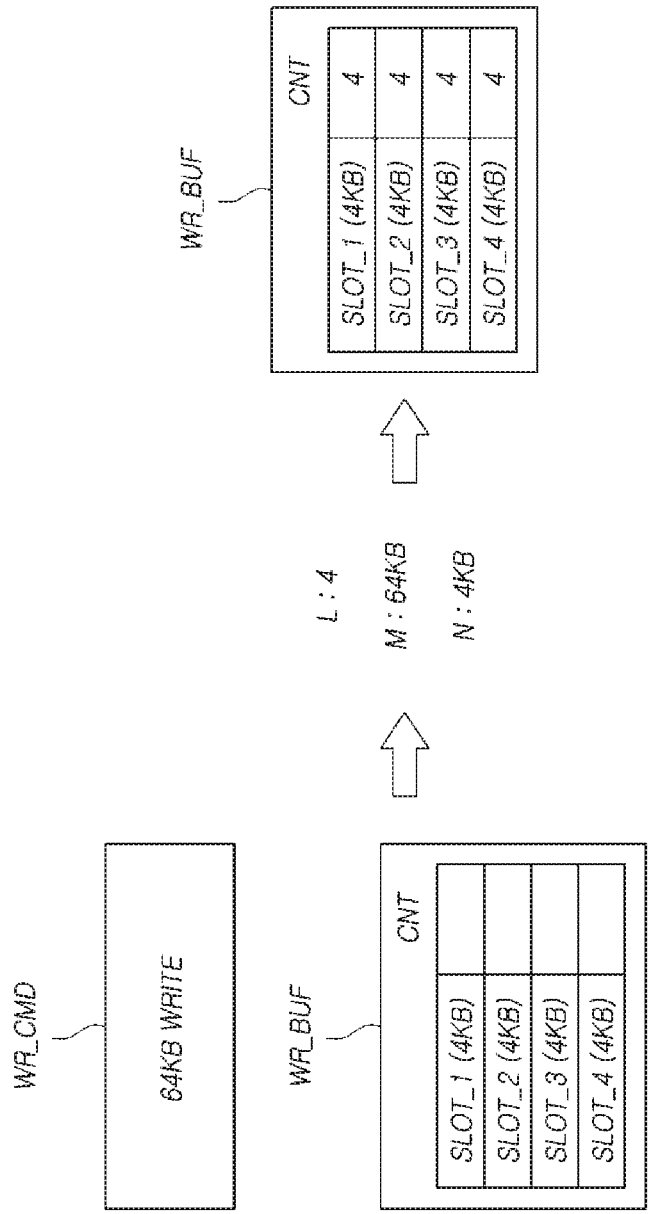
FIG. 13 is a diagram illustrating an example of configuring a write buffer in a memory system according to an embodiment of the present disclosure.

FIG. 13 is a diagram illustrating an example of configuring a write buffer in a memory system 100 according to an embodiment of the present disclosure.

The memory controller 120 of the memory system 100 may determine initial values of count information on the respective write buffer slots on the basis of the number of write buffer slots "L" the size of write data "M" received from the host (HOST), and/or the size of the write buffer slot "N".

In FIG. 13, the memory controller 120 processes a write command (WR_CMD) instructing an operation of writing 64 KB of data. In addition, the write buffer (WR_BUF) includes four write buffer slots (SLOT_1, SLOT_2, SLOT_3, and SLOT_4), and each of the write buffer slots has a size of 4 KB.

In this case, in order for the memory controller 120 to write 64 KB of data, the operation of writing 4 KB of data must be performed 16 times. Therefore, the memory controller 120 configures the count information (CNT) on the respective write buffer slots such that the sum of the values of count information (CNT) on the four write buffer slots (SLOT_1, SLOT_2, SLOT_3, and SLOT_4) is 16. For example, in FIG. 13, the memory controller 120 the CNT on each of SLOT_1, SLOT_2, SLOT_3, and SLOT_4) to be 4.

As described above, throughput for processing the write operation may vary according to the number of write buffer slots included in the write buffer (WR_BUF) when the memory controller 120 configures the write buffer (WR_BUF).

For example, in the case where the memory controller 120 processes an operation of writing 32 KB of data, if four write buffer slots having a size of 4 KB are allocated to the write buffer (WR_BUF), the write operations for up to 16 KB of data may be simultaneously executed. On the other hand, if two write buffer slots having a size of 4 KB are allocated to the write buffer (WR_BUF), only write operations for up to 8 KB of data may be simultaneously executed. Therefore, the more write buffer slots are allocated to the write buffer (WR_BUF), the higher the throughput for processing the write operation.

Figure 14:
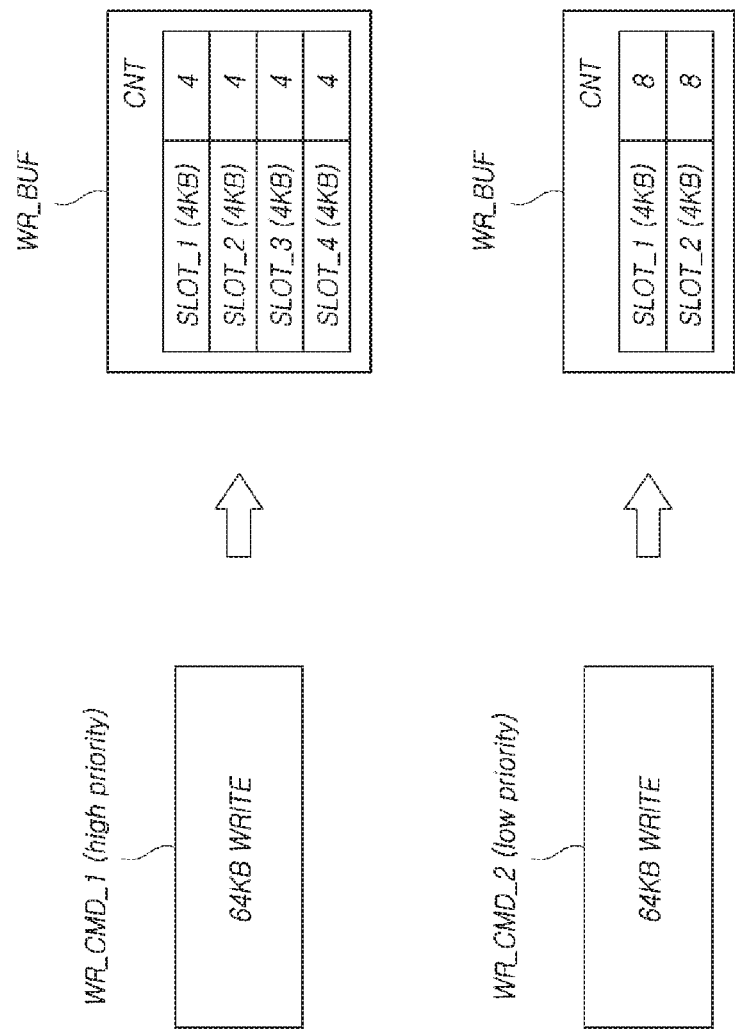
FIG. 14 is a diagram illustrating an example of differently setting the number of write buffer slots according to the priority of a write command in a memory system according to an embodiment of the present disclosure.

FIG. 14 is a diagram illustrating an example of differently setting the number of write buffer slots according to the priority of a write command in a memory system 100 according to an embodiment of the present disclosure.

Referring to FIG. 14, the number of write buffer slots may be determined on the basis of the priority of a write command.

The priority of a write command may be determined by the memory controller 120 on the basis of information of a write command received from the host (HOST). For example, if a flag indicating that a command requires urgent processing is set in the write command, the memory controller 120 may determine the priority of the corresponding write command to be higher than other commands. On the other hand, if a flag indicating that a command requires urgent processing is not set in the write command, or if the write command instructs to sequentially write a large amount of data, the memory controller 120 may determine the priority of the corresponding write command to be lower than other commands.

The memory controller 120 may perform control such that more write buffer slots are allocated to the write buffer in the case where a write command thereof has a higher priority. In FIG. 14, since the write command (WR_CMD_1) has a higher priority, the memory controller 120 performs control such that four write buffer slots (SLOT_1, SLOT_2, SLOT_3, and SLOT_4) are allocated to the write buffer. On the other hand, since the write command (WR_CMD_2) has a lower priority, the memory controller 120 performs control such that two write buffer slots (SLOT_1 and SLOT_2) are allocated to the write buffer.

In this case, since both the write command (WR_CMD_1) and the write command (WR_CMD_2) request an operation of writing 64 KB of data, the sum of the values of count information (CNT) on the write buffer slots in the write buffer (WR_BUF) must be equal.

Therefore, the value of the count information (CNT) on each write buffer slot in the write buffer (WR_BUF) may be determined to be greater when processing a write command having a lower priority.

In FIG. 14, the value of count information (CNT) on each write buffer slot when processing the write command (WR_CMD_2) is 8, which is greater than the value "4" of count information (CNT) on each write buffer slot when processing the write command (WR_CMD_1).

Accordingly, when processing the write command (WR_CMD_1), the memory controller 120 may perform a write operation at a high throughput, and may quickly return the allocated write buffer slot to the buffer pool. On the other hand, when processing the write command (WR_CMD_2), the memory controller 120 may perform a write operation at a low throughput, and may slowly return the allocated write buffer slot to the buffer pool.

Figure 15:
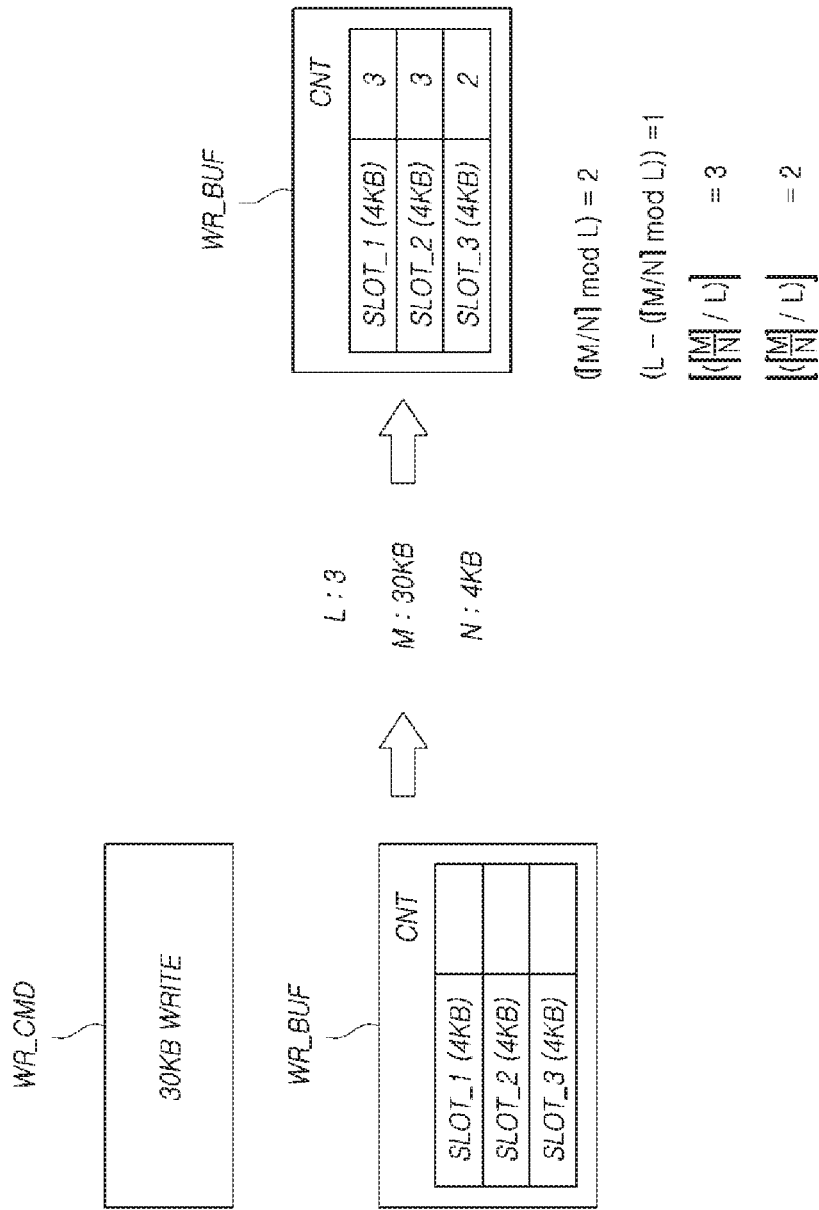
FIG. 15 is a diagram illustrating an example of setting an initial value of count information on each write buffer slot in a memory system according to an embodiment of the present disclosure.

FIG. 15 is a diagram illustrating an example of setting an initial value of count information CNT on each write buffer slot in a memory system 100 according to an embodiment of the present disclosure.

In FIG. 15, the memory controller 120 processes a write command (WR_CMD) instructing an operation of writing 30 KB of data. The write buffer (WR_BUF) includes three write buffer slots (SLOT_1, SLOT_2, and SLOT_3), and each of the write buffer slots has a size of 4 KB.

In this case, the number of write buffer slots is L (=3); the size of write data received from the host (HOST) is M (=30 KB); and the size of the write buffer slot is N (=4 KB).

The memory controller 120 performs control such that the sum of the values of count information (CNT) on the three write buffer slots (SLOT_1, SLOT_2, and SLOT_3) included in the write buffer (WR_BUF) is "$\lceil M/N \rceil$". In the example of three write buffer slots, i.e., SLOT_1, SLOT_2, and SLOT_3, the sum of the values of count information CNT may be 8 (=$\lceil$30 KB/4 KB$\rceil$). Here, the sum is rounded up to the nearest integer.

In this case, the memory controller 120 may set initial values of count information (CNT) as follows such that the values of count information (CNT) on the three write buffer slots (SLOT_1, SLOT_2, and SLOT_3) included in the write buffer (WR_BUF) are as uniform as possible.

First, the memory controller 120 may set initial values of count information (CNT) on each of 2 (=($\lceil M/N \rceil$ mod L)=(8 mod 3)) write buffer slots, among the three write buffer slots (SLOT_1, SLOT_2, and SLOT_3), to a value of "$\lceil (\lceil M/N \rceil / L) \rceil$". In this example, the initial value of count information CNT on each of these 2 write buffer slots may be set to 3 (=$\lceil 8/3 \rceil$).

In addition, the memory controller 120 may set an initial value of count information CNT on the "L−($\lceil M/N \rceil$ mod L)" write buffer slot among the three write buffer slots (SLOT_1, SLOT_2, and SLOT_3), to a value of "$\lfloor (\lceil M/N \rceil / L) \rfloor$". In this example, the initial value of count information CNT on this (=3−(8 mod 3)) write buffer slot may be set to a value of 2

(=⌊8/3⌋). Here, the operation includes rounding down to the nearest integer. In this case, the difference in count information (CNT) between the write buffer slots is set to 1 or less.

The operation in which the memory controller 120 sets the initial values of count information (CNT) on the respective write buffer slots included in the write buffer (WR_BUF) to be as uniform as possible is intended to maximize the throughput of a write operation using the write buffer slots allocated to the write buffer.

This is due to the fact that if a value of count information CNT on a specific write buffer slot, among the write buffer slots allocated to the write buffer, is too large, the processing of the overall write operation becomes slow because the write operation is executed using only the specific write buffer slot after the remaining write buffer slots are returned to the buffer pool early.

A method of selecting (⌈M/N⌉ mod L) write buffer slots of which initial values of count information (CNT) are set to a value of "⌈(⌈M/N⌉/L)⌉" among the above-described L write buffer slots, may be determined in any of various ways.

For example, the memory controller 120 may select (⌈M/N⌉ mod L) write buffer slots on the basis of index values (e.g., in descending order of index values). As another example, the memory controller 120 may randomly select (⌈M/N⌉ mod L) write buffer slots from among the L write buffer slots.

Hereinafter, a detailed method of setting the number of read buffer slots included in a read buffer and initial values of count information on the respective read buffer slots according to a read command will be described with reference to FIGS. 16 to 18.

Figure 16:
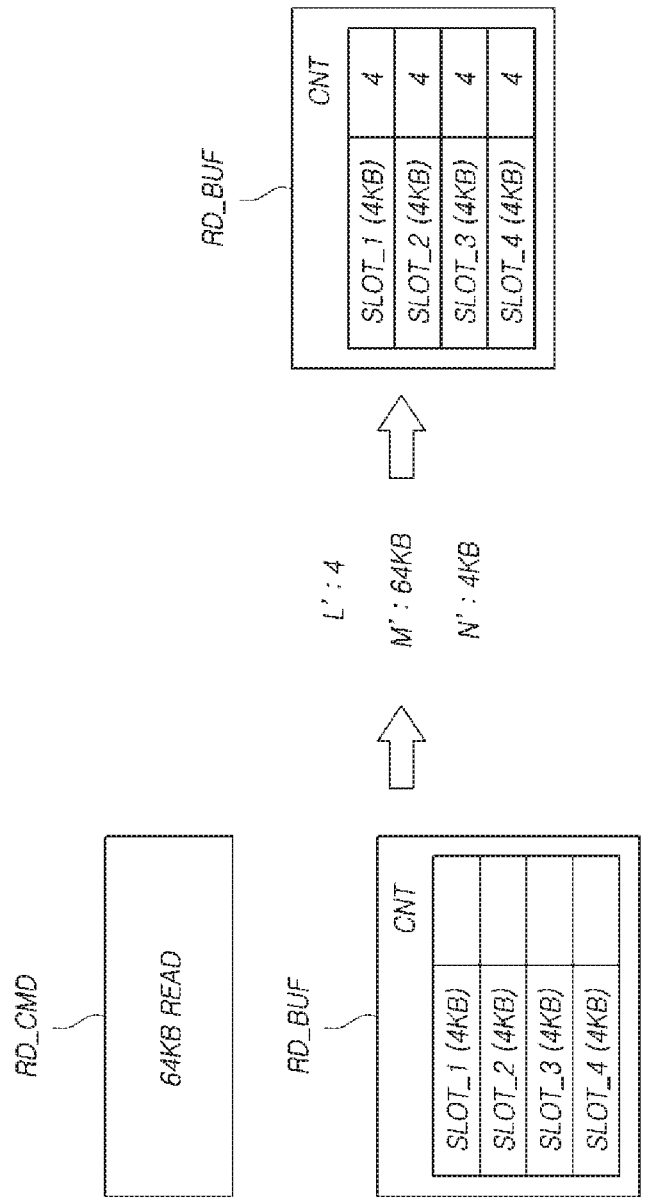
FIG. 16 is a diagram illustrating an example of configuring a read buffer in a memory system according to an embodiment of the present disclosure.

FIG. 16 is a diagram illustrating an example of configuring a read buffer in a memory system 100 according to an embodiment of the present disclosure.

The memory controller 120 of the memory system 100 may determine an initial value of count information on each of the read buffer slots on the basis of the number of read buffer slots "L", the size of read data "M", and the size of the read buffer slot "N".

In FIG. 16, the memory controller 120 processes a read command (RD_CMD) instructing an operation of reading 64 KB of data. In addition, the read buffer (RD_BUF) includes four read buffer slots (SLOT_1, SLOT_2, SLOT_3, and SLOT_4), and each of the read buffer slots has a size of 4 KB.

In this case, in order for the memory controller 120 to read 64 KB of data, the operation of reading 4 KB of data must be performed 16 times. Therefore, the memory controller 120 configures count information (CNT) on the respective read buffer slots such that the sum of the values of count information (CNT) on the four read buffer slots (SLOT_1, SLOT_2, SLOT_3, and SLOT_4) is 16. For example, in FIG. 16, the memory controller 120 makes configuration such that the values of count information (CNT) on the four read buffer slots (SLOT_1, SLOT_2, SLOT_3, and SLOT_4) are 4, respectively.

Like the write buffer (WR_BUF), throughput for processing the read operation may vary according to the number of read buffer slots included in the read buffer (RD_BUF) when the memory controller 120 configures the read buffer (RD_BUF).

For example, in the case where the memory controller 120 processes an operation of reading 32 KB of data, if four read buffer slots having a size of 4 KB are allocated to the read buffer (RD_BUF), the read operations for up to 16 KB of data may be simultaneously executed. On the other hand, if two read buffer slots having a size of 4 KB are allocated to the read buffer (RD_BUF), only read operations for up to 8 KB of data may be simultaneously executed. Therefore, the more read buffer slots are allocated to the read buffer (RD_BUF), the higher the throughput for processing the read operation.

Figure 17:
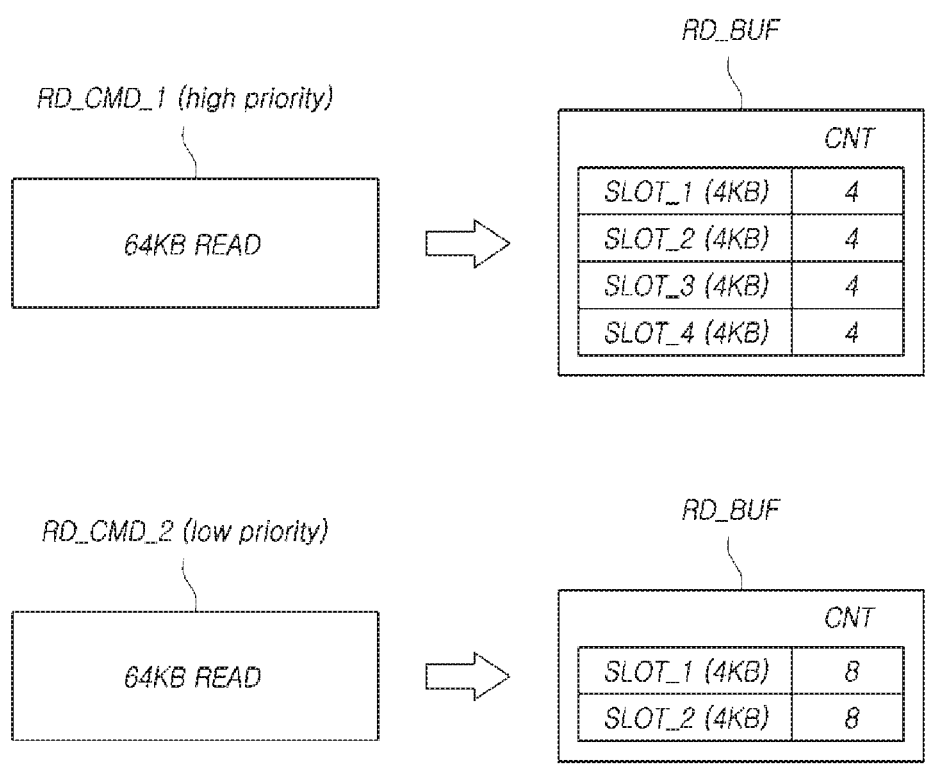
FIG. 17 is a diagram illustrating an example of differently setting the number of read buffer slots according to the priority of a read command in a memory system according to an embodiment of the present disclosure.

FIG. 17 is a diagram illustrating an example of differently setting the number of read buffer slots according to the priority of a read command in a memory system 100 according to an embodiment of the present disclosure.

Referring to FIG. 17, the number of read buffer slots may be determined on the basis of the priority of a read command.

Like the write command, the priority of a read command may be determined by the memory controller 120 on the basis of information of a read command received from the host (HOST). For example, if a flag indicating that a command requires urgent processing is set in the read command, the memory controller 120 may determine the priority of the corresponding read command to be higher than other commands. On the other hand, if a flag indicating that a command requires urgent processing is not set in the read command, or if the read command instructs to sequentially read a large amount of data, the memory controller 120 may determine the priority of the corresponding read command to be lower than other commands.

The memory controller 120 may perform control such that more read buffer slots are allocated to the read buffer for the read command having a higher priority. In FIG. 17, since the read command (RD_CMD_1) has a higher priority, the memory controller 120 performs control such that four read buffer slots (SLOT_1, SLOT_2, SLOT_3, and SLOT_4) are allocated to the read buffer. On the other hand, since the read command (RD_CMD_2) has a lower priority, the memory controller 120 performs control such that two (less than four) read buffer slots (SLOT_1 and SLOT_2) are allocated to the read buffer.

In this case, since both the read command (RD_CMD_1) and the read command (RD_CMD_2) request an operation of reading 64 KB of data, the sum of the values of count information (CNT) on the read buffer slots included in the read buffer (RD_BUF) must be equal.

Therefore, the value of the count information (CNT) on each read buffer slot included in the read buffer (RD_BUF) may be determined to be greater when processing a read command having a lower priority.

In FIG. 17, the value of count information (CNT) on each read buffer slot when processing the read command (RD_CMD_2) is 8, which is greater than the value "4" of count information (CNT) on each read buffer slot when processing the read command (RD_CMD_1).

Accordingly, when processing the read command (RD_CMD_1), the memory controller 120 may perform a read operation at a high throughput, and may quickly return the allocated read buffer slot to the buffer pool. On the other hand, when processing the read command (RD_CMD_2), the memory controller 120 may perform a read operation at a low throughput, and may slowly return the allocated read buffer slot to the buffer pool.

Figure 18:
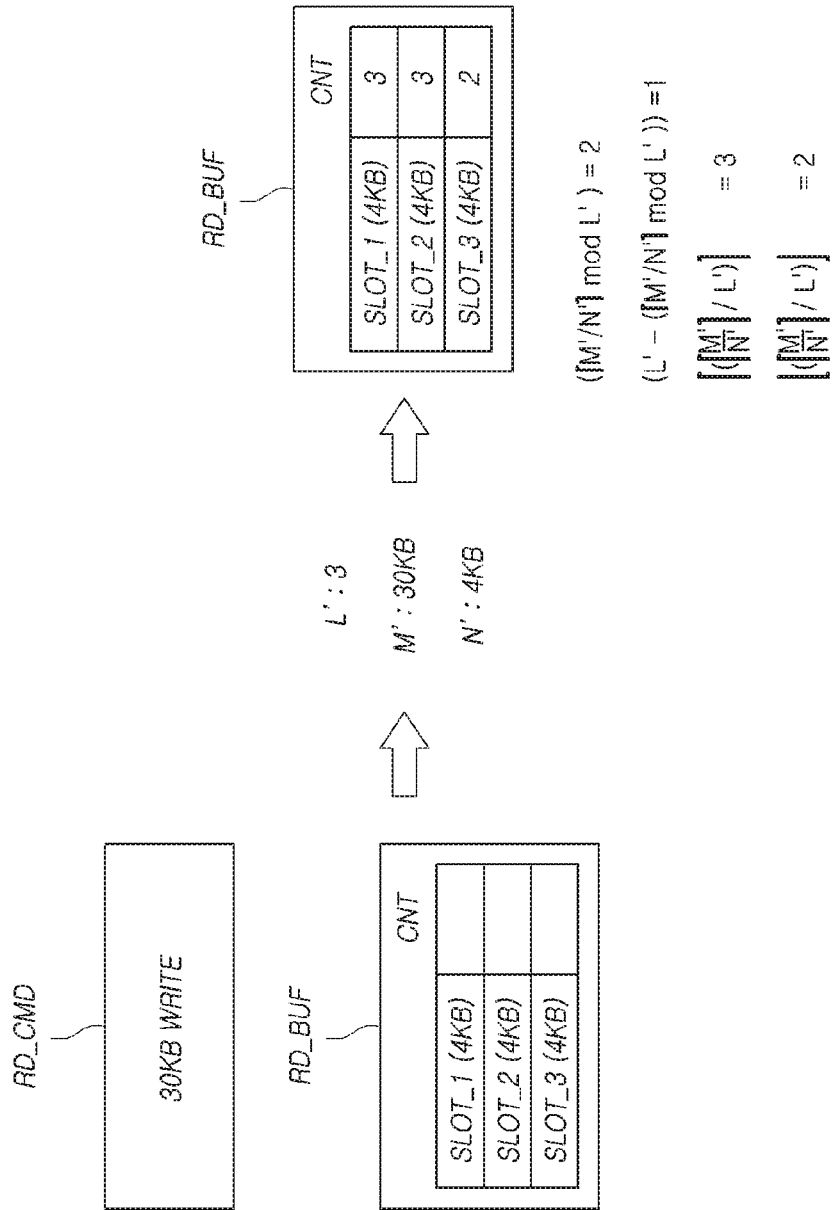
FIG. 18 is a diagram illustrating an example of setting an initial value of count information on each read buffer slot in a memory system according to an embodiment of the present disclosure.

FIG. 18 is a diagram illustrating an example of setting an initial value of count information (CNT) on each read buffer slot in a memory system 100 according to an embodiment of the present disclosure.

In FIG. 18, the memory controller 120 processes a read command (RD_CMD) instructing an operation of reading 30

KB of data. The read buffer (RD_BUF) includes three read buffer slots (SLOT_1, SLOT_2, and SLOT_3), each of which has a size of 4 KB.

In this case, the number of read buffer slots is L'=3; the read size of a read command received from the host (HOST) is M'=30 KB; and the size of the read buffer slot is N'=4 KB.

The memory controller 120 performs control such that the sum of the values of count information (CNT) on the three read buffer slots (SLOT_1, SLOT_2, and SLOT_3) included in the read buffer RD_BUF is "⌈M'/N'⌉". In the example, the sum of the values of count information CNT is 8 (=⌈30 KB/4 KB⌉).

In this case, the memory controller 120 may set initial values of count information (CNT) as follows such that the values of count information (CNT) on the three read buffer slots (SLOT_1, SLOT_2, and SLOT_3) included in the read buffer (RD_BUF) are as uniform as possible.

First, the memory controller 120 may set initial values of count information (CNT) on (⌈M/N⌉ mod L')=(8 mod 3)=2 read buffer slots, among the three read buffer slots SLOT_1, SLOT_2, and SLOT_3 to a value of "⌈(⌈M/N⌉ L')⌉". In this example, the initial values of count information CNT on each of these two buffer slots may be set to 3 (=⌈8/3⌉).

In addition, the memory controller 120 may set an initial value of count information CNT on the "L'-(⌈M/N⌉ mod L')" read buffer slot to a value of "⌊(⌈M/N⌉/L')⌋". In this example, the initial value of count information CNT on SLOT (=3−(8 mod 3)) may be set to a value of 2 (=⌊8/3⌋). In this case, the count information (CNT) among the read buffer slots is 1.

Like the write buffer (WR_BUF), the operation in which the memory controller 120 sets the initial values of count information (CNT) on the respective read buffer slots included in the read buffer (RD_BUF) to be as uniform as possible is intended to maximize the throughput of a read operation using the read buffer slot allocated to the read buffer.

This is due to the fact that if a value of count information (CNT) on a specific read buffer slot, among the read buffer slots allocated to the read buffer, is too large, the processing of the overall read operation becomes slow because the read operation is executed using only the specific read buffer slot after the remaining read buffer slots are returned to the buffer pool early.

A method of selecting "⌈M'/N'⌉ mod L'" read buffer slots of which initial values of count information CNT are set to a value of "⌈(M'/N')/L')⌉" among the above-described L' read buffer slots, may be determined in any of various manners.

For example, the memory controller 120 may select ⌈M'/N'⌉ mod L' read buffer slots on the basis of index values (e.g., in descending order of index values). As another example, the memory controller 120 may randomly select ⌈M'/N'⌉ mod L' read buffer slots from among the L' read buffer slots.

Figure 19:
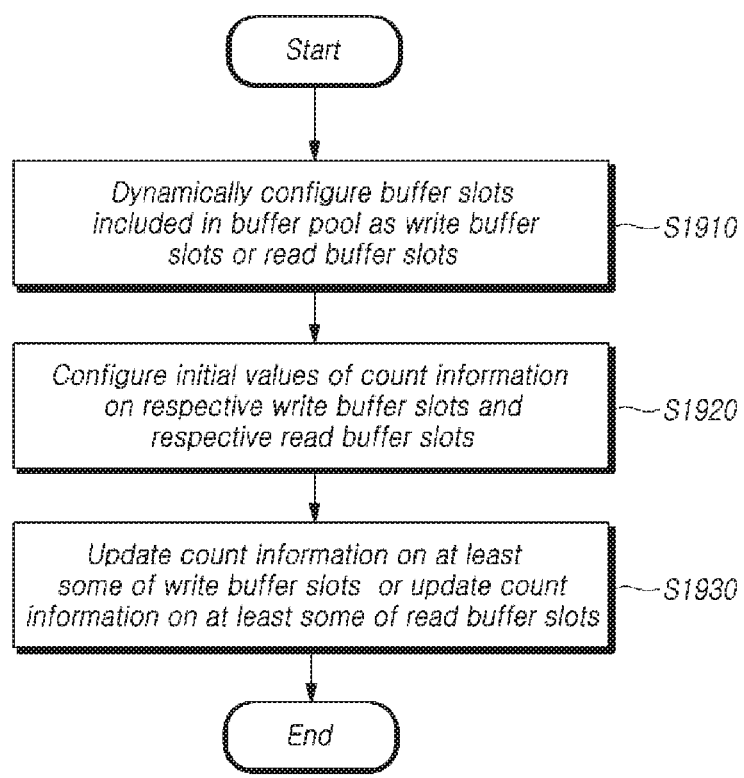
FIG. 19 is a flowchart illustrating a method of operating a memory controller according to an embodiment of the present disclosure.

FIG. 19 is a flowchart illustrating a method of operating a memory controller 120 according to an embodiment of the present disclosure.

A method of operating the memory controller 120 may include dynamically configuring one or more write buffer slots in a write buffer or one or more read buffer slots in a read buffer from among one or more buffer slots included in a buffer pool (S1910).

In addition, the method of operating the memory controller 120 may include setting an initial value of count information on each of the write buffer slots and the read buffer slots configured in step S1910. Each count value indicates a remaining period allocated to the associated write buffer or read buffer (S1920).

In addition, the method may include updating, by the memory controller 120, count information on at least some of the write buffer slots when data is written to the write buffer or updating count information on at least some of the read buffer slots when data is read out from the read buffer (S1930). Which write or read buffer slots are updated depends on the specifics of the write or read operation as previously explained.

The operation of the memory controller 120 described above may be controlled by the control circuit 123, and the processor 124 may execute (drive) firmware in which all the operation of the memory controller 120 are performed.

Figure 20:
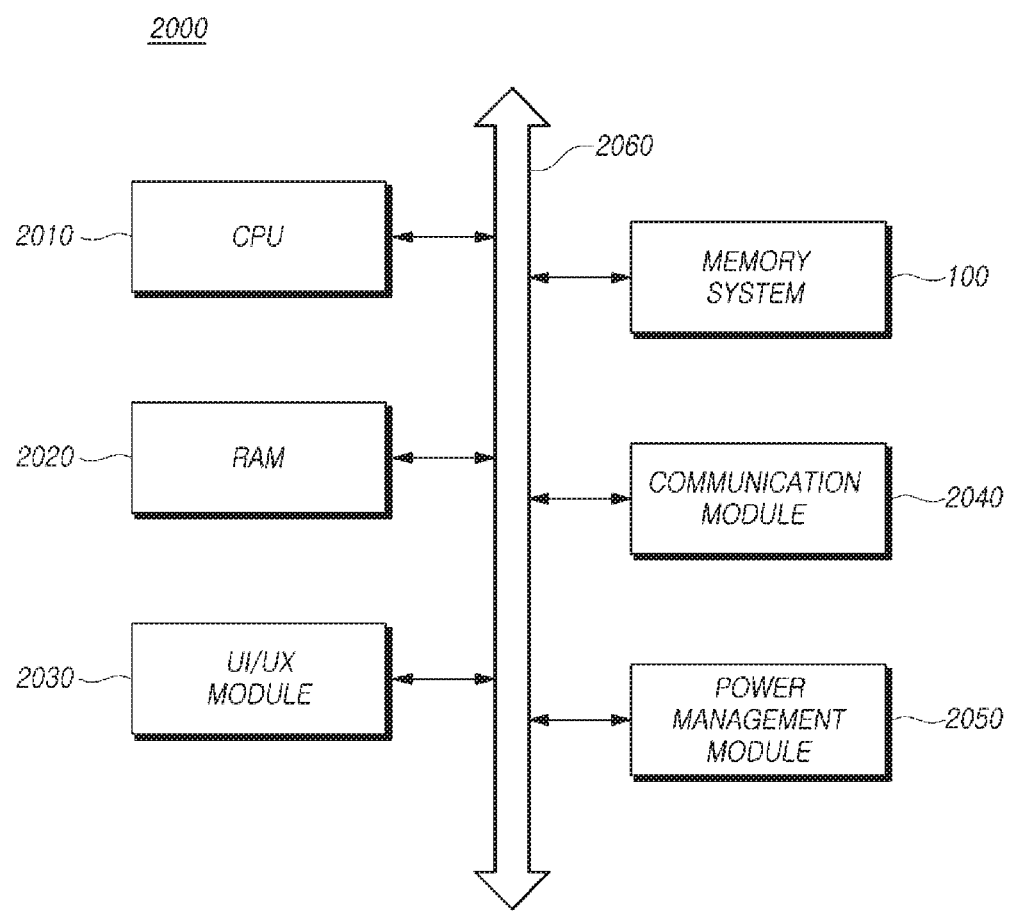
FIG. 20 is a diagram illustrating a configuration of a computing system according to an embodiment of the present disclosure.

FIG. 20 is a block diagram schematically illustrating a computing system 2000 according to an embodiment of the present disclosure.

Referring to FIG. 20, a computing system 2000 may include a memory system 100 electrically connected to a system bus 2060, a central processing unit (CPU) 2010 for controlling overall operation of the computing system 2000, a random access memory (RAM) 2020 for storing data and information related to the operation of the computing system 2000, a user interface/user experience (UI/UX) module 2030 for providing a user with a user environment, a communication module 2040 for communicating with an external device through wired and/or wireless communication, a power management module 2050 for managing power used by the computing system 2000, and the like.

The computing system 2000 may be a personal computer (PC), or may include a mobile terminal, such as a smart phone, a tablet PC, or the like, or any of various other electronic devices.

The computing system 2000 may further include a battery for supplying an operating voltage, an application chipset, a graphics-related module, a camera image processor (CIS), a DRAM, and the like. Of course, the computing system may include other components as those skilled in the art understand.

The memory system 100 may include a device for storing data in a non-volatile memory, such as a solid state drive (SSD), a universal flash storage (UFS) device, an embedded MMC (eMMC) device, or the like. Alternatively, the memory system 100 may include a device for storing data in a magnetic disk, such as a hard disk drive (HDD). The non-volatile memory may include any of read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. In addition, the memory system 100 may be implemented as any of various types of storage devices, and may be mounted to any of various electronic devices.

Although embodiments of the present disclosure has been illustrated and described, those skilled in the art will appreciate that various modifications, additions and substitutions are possible, without departing from the scope and spirit of the disclosure as disclosed in the accompanying claims. Therefore, the disclosed embodiments are presented merely as examples. The scope of the present invention encompasses all arrangements and configurations that fall within the scope of the claims including their equivalents.

What is claimed is:

1. A memory system comprising:
a memory device comprising a plurality of memory blocks; and
a memory controller configured to control the memory device,
wherein the memory controller is configured to:
allocate one or more of a plurality of buffer slots in a buffer pool to a write buffer as write buffer slots or to a read buffer as read buffer slots;
configure initial values of count information on the respective write buffer slots and the respective read buffer slots, which indicate remaining allocation periods of the write buffer slots and the read buffer slots respectively; and
update the count information on each of at least some of the write buffer slots when data is written to the write buffer or update the count information on each of at least some of the read buffer slots when data is read out from the read buffer.

2. The memory system of claim 1, wherein, when a write operation on a target write buffer slot among the write buffer slots is completed, the memory controller reduces a value of count information on the target write buffer slot by a first value.

3. The memory system of claim 2, wherein, when the value of count information on the target write buffer slot is less than or equal to a first threshold count value, the memory controller returns the target write buffer slot to the buffer pool.

4. The memory system of claim 1, wherein, when a read operation on a target read buffer slot among the read buffer slots is completed, the memory controller reduces a value of count information on the target read buffer slot by a second value.

5. The memory system of claim 4, wherein when the value of count information on the target read buffer slot is less than or equal to a second threshold count value, the memory controller returns the target read buffer slot to the buffer pool.

6. The memory system of claim 1, wherein the memory controller is configured to determine the initial value of count information on each of the write buffer slots on the basis of a number of write buffer slots (L), a size of write data (M) received from a host, or a size of the write buffer slot (N).

7. The memory system of claim 6, wherein the number of write buffer slots (L) is determined on the basis of a priority of a write command corresponding to the write data.

8. The memory system of claim 6, wherein the memory controller sets the initial value of count information on each of ⌈M/N⌉ mod L write buffer slots, among the write buffer slots, to a value of ⌈(⌈M/N⌉/L)⌉, and sets the initial value of count information on each of L−(⌈M/N⌉ mod L) write buffer slots, among the write buffer slots, to a value of ⌊(⌈M/N⌉/L)⌋.

9. The memory system of claim 1, wherein the memory controller is configured to determine the initial value of count information on each of the read buffer slots on the basis of a number of read buffer slots (L'), a size of read data (M'), and a size of the read buffer slot (N').

10. The memory system of claim 9, wherein the number of read buffer slots (L') is determined on the basis of a priority of a read command corresponding to the read data.

11. The memory system of claim 9, wherein the memory controller sets the initial value of count information on each ⌈M'/N'⌉ mod L' read buffer slots, among the read buffer slots, to a value of ⌈(⌈M'/N'⌉/L')⌉, and sets the initial value of count information on each of L'−(⌈M'/N'⌉ mod L') read buffer slots among the read buffer slots to a value of ⌊(⌈M'/N'⌉/L')⌋.

12. A memory controller comprising:
a memory interface configured to communicate with a memory device comprising a plurality of memory blocks; and
a control circuit configured to control the memory device,
wherein the control circuit is further configured to:
allocate one or more of a plurality of buffer slots in a buffer pool to a write buffer as write buffer slots or to a read buffer as read buffer slots;
configure initial values of count information on the respective write buffer slots and the respective read buffer slots, which indicate remaining allocation periods of the write buffer slots and the read buffer slots respectively; and
update the count information on each of at least some of the write buffer slots when data is written to the write buffer or update the count information on each of at least some of the read buffer slots when data is read out from the read buffer.

13. The memory controller of claim 12, wherein, when a write operation on a target write buffer slot among the write buffer slots is completed, the control circuit reduces a value of count information on the target write buffer slot by a first value.

14. The memory controller of claim 13, wherein, when the value of count information on the target write buffer slot is less than or equal to a first threshold count value, the control circuit returns the target write buffer slot to the buffer pool.

15. The memory controller of claim 12, wherein, when a read operation on a target read buffer slot among the read buffer slots is completed, the control circuit reduces a value of count information on the target read buffer slot by a second value.

16. The memory controller of claim 15, wherein, when the value of count information on the target read buffer slot is less than or equal to a second threshold count value, the control circuit returns the target read buffer slot to the buffer pool.

17. The memory controller of claim 12, wherein the control circuit is configured to determine the initial value of count information on each of the write buffer slots on the basis of a number of write buffer slots (L), a size of write data (M) received from a host, and a size of the write buffer slot (N).

18. The memory controller of claim 17, wherein the control circuit sets the initial values of count information on each of ⌈M/N⌉ mod L write buffer slots, among the write buffer slots, to a value of ⌈(⌈M/N⌉/L)⌉, and sets the initial values of count information on each of L−(⌈M/N⌉ mod L) write buffer slots, among the write buffer slots, to a value of ⌊(⌈M/N⌉/L)⌋.

19. The memory controller of claim 12, wherein the control circuit is configured to determine the initial value of count information on each of the read buffer slots on the basis of a number of read buffer slots (L'), a size of read data (M'), and a size of the read buffer slot (N').

20. A method of operating a memory controller, the method comprising:
dynamically configuring a plurality of buffer slots in a buffer pool as one or more write buffer slots in a write buffer or one or more read buffer slots in a read buffer;
configuring initial values of count information on the respective write buffer slots and the respective read buffer slots, which indicate remaining allocation periods of the write buffer slots and the read buffer slots respectively; and updating count information on each of at least some of the write buffer slots when data is written to the write buffer or updating count information on each of at least some of the read buffer slots when data is read out from the read buffer.

\* \* \* \* \*